United States Patent
Sato

(10) Patent No.: US 10,836,187 B2
(45) Date of Patent: Nov. 17, 2020

(54) RECORDING APPARATUS

(71) Applicant: CANON FINETECH NISCA INC., Misato (JP)

(72) Inventor: Takehiro Sato, Chiba (JP)

(73) Assignee: Canon Finetech Nisca Inc., Misato (JP)

( * ) Notice: Subject to any disclaimer, the term of this patent is extended or adjusted under 35 U.S.C. 154(b) by 0 days.

(21) Appl. No.: 16/227,297

(22) Filed: Dec. 20, 2018

(65) Prior Publication Data

US 2019/0193430 A1   Jun. 27, 2019

(30) Foreign Application Priority Data

Dec. 22, 2017 (JP) ................................. 2017-247000
Dec. 19, 2018 (JP) ................................. 2018-237584

(51) Int. Cl.
*B41J 15/04* (2006.01)
*B41J 11/00* (2006.01)
(Continued)

(52) U.S. Cl.
CPC ........... *B41J 15/046* (2013.01); *B41J 11/007* (2013.01); *B41J 11/0095* (2013.01); *B41J 11/42* (2013.01);
(Continued)

(58) Field of Classification Search
CPC ........ B41J 15/046; B41J 11/425; B41J 15/02; B41J 15/04; B41J 11/42; B41J 15/048; B41J 11/007; B41J 11/0095; B65G 39/00
See application file for complete search history.

(56) References Cited

U.S. PATENT DOCUMENTS

| 6,633,740 B2 * | 10/2003 | Estabrooks | ............. B41J 11/42 399/299 |
| 2011/0211896 A1 * | 9/2011 | Kawaguchi | ........... B41J 11/008 400/582 |

(Continued)

FOREIGN PATENT DOCUMENTS

JP   2007-246222 A   9/2007

*Primary Examiner* — Justin Seo
(74) *Attorney, Agent, or Firm* — Venable LLP

(57) ABSTRACT

A recording apparatus can convey a recording sheet such as a long sheet with high precision without decreasing productivity even if a back tension occurs during conveyance of the recording sheet. The recording apparatus sets a first acceleration period in which the conveying speed is increased up to a first predetermined speed before a leading end of the roll paper reaches a detecting position of the leading end detecting sensor with the roll paper being nipped by the upstream side nip roller and the conveying belt. Further, the recording apparatus sets a first constant speed period in which the conveying speed is kept constant at the first predetermined speed before the leading end of the roll paper reaches the detecting position until the leading end of the roll paper is nipped by the downstream side nip roller and the conveying belt. Furthermore, the recording apparatus sets a second acceleration period in which the conveying speed is increased up to a second predetermined speed before the recording by the recording head is started after the leading end of the roll paper is nipped by the downstream side nip roller and the conveying belt.

26 Claims, 12 Drawing Sheets

(51) Int. Cl.
*B41J 11/42* (2006.01)
*B65G 39/00* (2006.01)
*B41J 15/02* (2006.01)

(52) U.S. Cl.
CPC ............ *B41J 11/425* (2013.01); *B41J 15/02* (2013.01); *B41J 15/04* (2013.01); *B41J 15/048* (2013.01); *B65G 39/00* (2013.01)

(56) References Cited

U.S. PATENT DOCUMENTS

| | | | |
|---|---|---|---|
| 2013/0282167 A1* | 10/2013 | Nozaki | B65G 43/00 700/230 |
| 2015/0174931 A1* | 6/2015 | Horaguchi | B41J 11/42 347/16 |
| 2018/0147866 A1* | 5/2018 | Ramis Llinares | B41J 15/046 |

* cited by examiner

RECORDING APPARATUS

BACKGROUND OF THE INVENTION

Field of the Invention

The present invention relates to a recording apparatus for conveying and recording a roll-shaped recording sheet.

Description of the Related Art

As a recording apparatus for recording an image on a recording sheet such as a roll-shaped paper which is wound in a roll shape, an ink jet type printer is known. In an ink jet type printer, a long sheet drawn out from a roll portion where a sheet is wound in a roll shape is conveyed by a conveying apparatus while being guided by a conveying guide. Then, an image is recorded on the long sheet by ejecting ink droplets from a plurality of recording heads In such a conveying apparatus, a long sheet is conveyed in a conveying direction by conveying rollers. When a roll portion of the long sheet starts to rotate from a halt state, a resistance occurs on the conveying rollers in the direction opposite to the conveying direction. This resistance is a rotational load generated during conveyance by an angular acceleration from the start of rotation of the roll portion of the long sheet having mass until the roll portion is rotated at a constant speed. In such a conveying apparatus, this rotational load works as a back tension against the conveying direction of the long sheet. Therefore, when the back tension is large, a deviation may occur for the conveying amount of the long sheet conveyed by the conveying rollers.

On the other hand, Japanese Patent Application Laid-Open No. 2007-246222 relates to a conveying apparatus that suppresses an influence of a rotational load of such a long sheet, and discloses a configuration in which the magnitude of the acceleration is limited during a speed change of the conveying roller in accordance with the weight of the long sheet such that the rotational load of the long sheet becomes a predetermined magnitude.

However, in the apparatus of Japanese Patent Application Laid-Open No. 2007-246222, when the weight of the roll paper is large, a rotational load due to the inertia of the roll paper increases. Therefore, in order to set the rotational load to a predetermined magnitude, the acceleration of the conveying rollers needs to be lowered. Therefore, in the apparatus disclosed in Japanese Patent Application Laid-Open No. 2007-246222, as the weight of the roll paper is larger, the time required for acceleration until a constant speed becomes longer. As a result, the recording operation needs to be delayed, causing a problem of a decrease in productivity.

SUMMARY OF THE INVENTION

A recording apparatus according to the present invention, comprises:
a holding unit configured to hold a roll-shaped recording sheet;
a first nipping and conveying unit configured to nip and convey a sheet portion drawn out from the roll-shaped recording sheet which is held by the holding unit;
a detecting unit configured to detect the sheet portion at a detecting position which is provided downstream of a nipping position of the first nipping and conveying unit in a conveying direction of the sheet portion;
a second nipping and conveying unit provided downstream of the detecting position in the conveying direction of the sheet portion, the second nipping and conveying unit being configured to nip and convey the sheet portion with the sheet portion being nipped by the first nipping and conveying unit;
a recording unit configured to perform recording on the sheet portion conveyed by the second nipping and conveying unit; and
a control unit configured to control a conveying speed of the sheet portion conveyed by the first nipping and conveying unit and the second nipping and conveying unit,
wherein the control unit sets a first acceleration period in which the conveying speed is increased up to a first predetermined speed before a leading end of the sheet portion reaches the detecting position with the sheet portion being nipped by the first nipping and conveying unit,
wherein the control unit sets a first constant speed period in which the conveying speed is kept constant at the first predetermined speed before the leading end of the sheet portion reaches the detecting position until the leading end of the sheet portion is nipped by the second nipping and conveying unit, and
wherein the control unit sets a second acceleration period in which the conveying speed is increased up to a second predetermined speed which is larger than the first predetermined speed before the recording by the recording unit is started after the leading end of the sheet portion is nipped by the second nipping and conveying unit.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings.

First Embodiment

<Configuration of Recording Apparatus>

Figure 1:
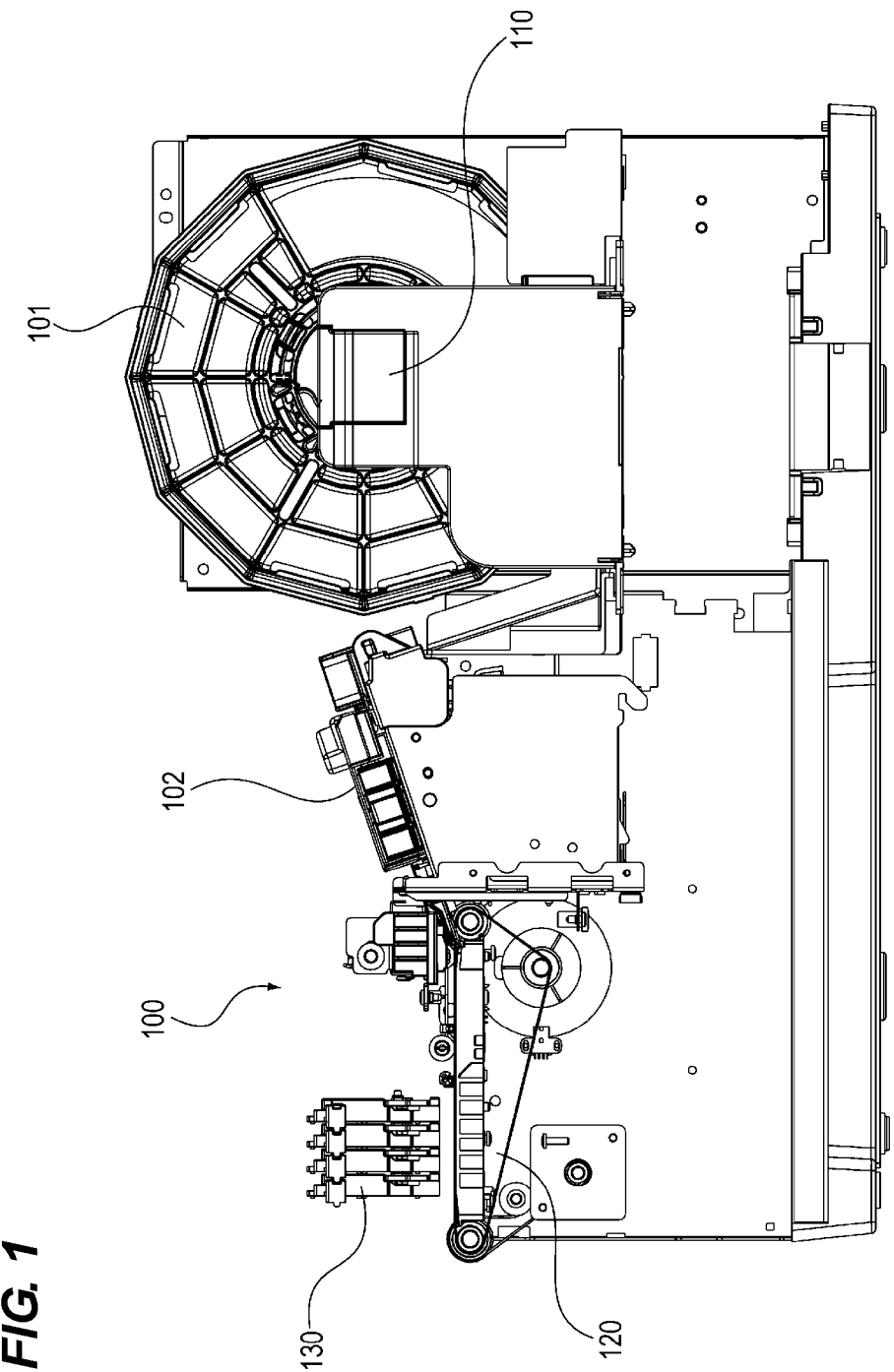
FIG. 1 is a schematic diagram of a recording apparatus according to the first embodiment of the present invention.
Figure 2:
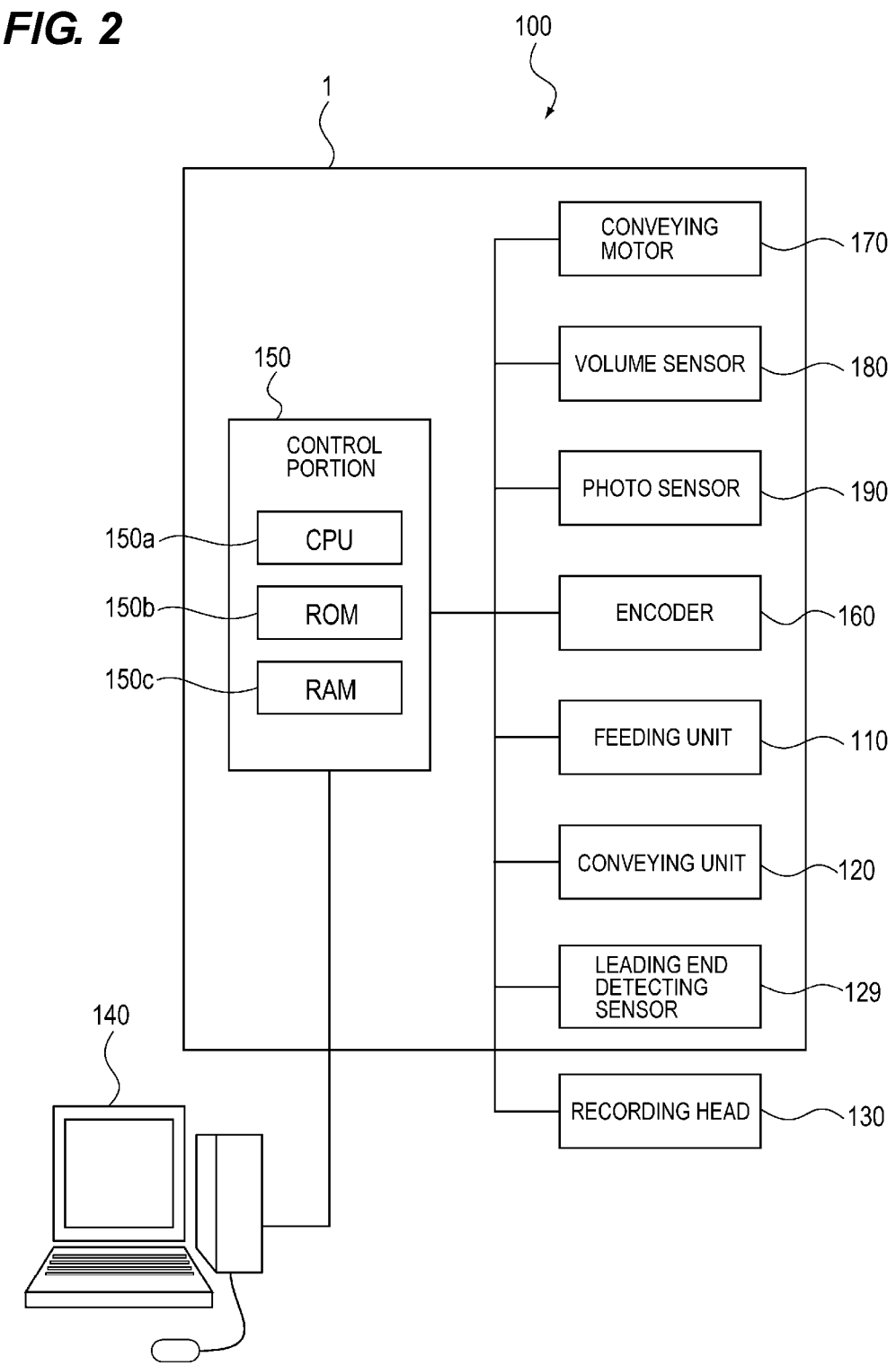
FIG. 2 is a block diagram showing a configuration of the recording apparatus according to the first embodiment of the present invention.

The configuration of the recording apparatus 100 according to the first embodiment of the present invention will be described in detail with reference to FIGS. 1 and 2. FIG. 1 is a schematic diagram of the recording apparatus according to the first embodiment of the present invention, and FIG. 2 is a block diagram showing a configuration of the recording apparatus according to the first embodiment of the present invention.

The recording apparatus 100 can be connected to the personal computer 140, and has the conveying apparatus 1, the recording head 130 and so on. The recording apparatus 100 is exemplified as an ink jet type printer in this embodiment.

The conveying apparatus 1 draws out the roll paper 101, which is a long sheet wound in a roll shape and conveys it. Further, the conveying device 1 may convey not only a long sheet of the roll paper 101, but also a long sheet of a material such as a resin sheet.

The recording head 130 as a recording unit forms an image on the roll paper 101 as a sheet portion conveyed by the conveying apparatus 1 by using an ink jet printing method. As the recording head 130, a line head is used, which has a plurality of nozzles arranged approximately in the same width as the maximum recording width of the roll paper to be used. Further, the recording head 130 is not limited to this configuration and a serial type recording head can be used, which performs recording by repeating conveyance and stoppage of the roll paper and by scanning in the width direction orthogonal to the conveying direction (the direction crossing the conveying direction) of the roll paper 101 while the roll paper is stopped. Ink is ejected from the recording head 130 on the sheet portion conveyed to a recording region opposite to the recording head 130.

The control portion 150 (see FIG. 2) of the conveying apparatus 1 controls the overall operation of the recording apparatus 100. Specifically, the control portion 150 has the CPU 150a, the ROM 150b, and the RAM 150c.

The CPU 150a as the control portion controls the overall operation of the control portion 150 by executing a control program stored in the ROM 150b.

The control program is stored in the ROM 150b.

The RAM 150c functions as a working area of the CPU 150a.

Further, the recording apparatus 100 has a cutter (not shown) for cutting off a piece of the roll paper 101 and discharging it to a discharge portion of the recording apparatus 100.

<Configuration of Conveying Apparatus>

Figure 3:
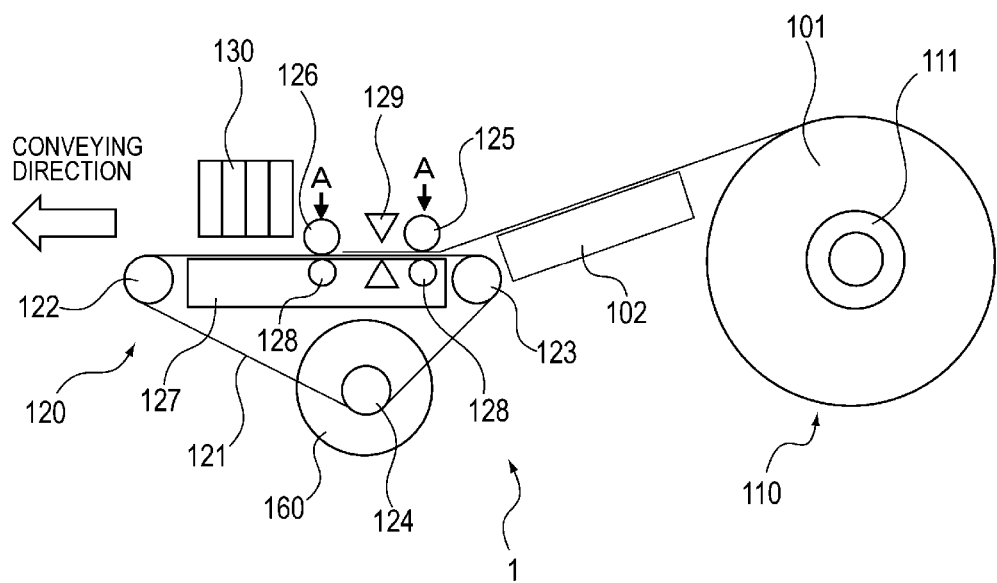
FIG. 3 is a side view schematically showing a conveying apparatus according to the first embodiment of the present invention.

The configuration of the conveying apparatus 1 according to the first embodiment of the present invention will be described in detail with reference to FIGS. 1 to 5. FIG. 3 is a side view schematically showing the conveying apparatus according to the first embodiment of the present invention, FIG. 4 is a perspective view of a guide unit according to the first embodiment of the present invention, and FIG. 5 is a plan view schematically showing the conveying apparatus according to the first embodiment of the present invention.

The conveying apparatus 1 has the guide unit 102, the feeding unit 110, the conveying unit 120, the leading end detecting sensor 129, the encoder 160, the conveying motor 170 (see FIG. 2), and the photo sensor 190 (see FIG. 2).

The guide unit 102 regulates the position of the roll paper 101 in the width direction and guides to the conveying unit 120 the roll paper (sheet portion) 101 which is drawn out and fed from the feeding unit 110.

Figure 4:
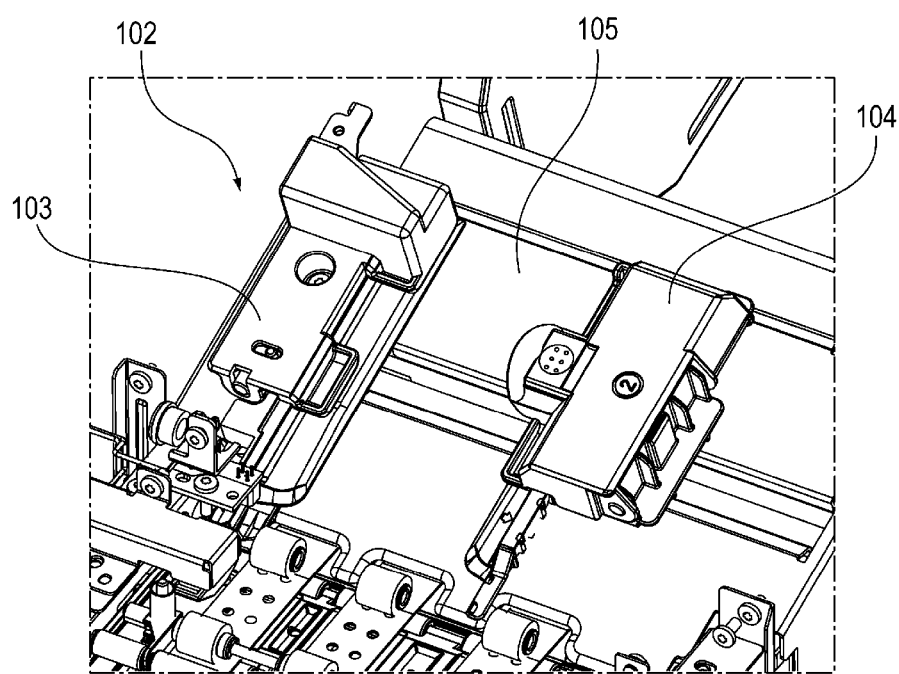
FIG. 4 is a perspective view of a guide unit according to the first embodiment of the present invention.
Figure 5:
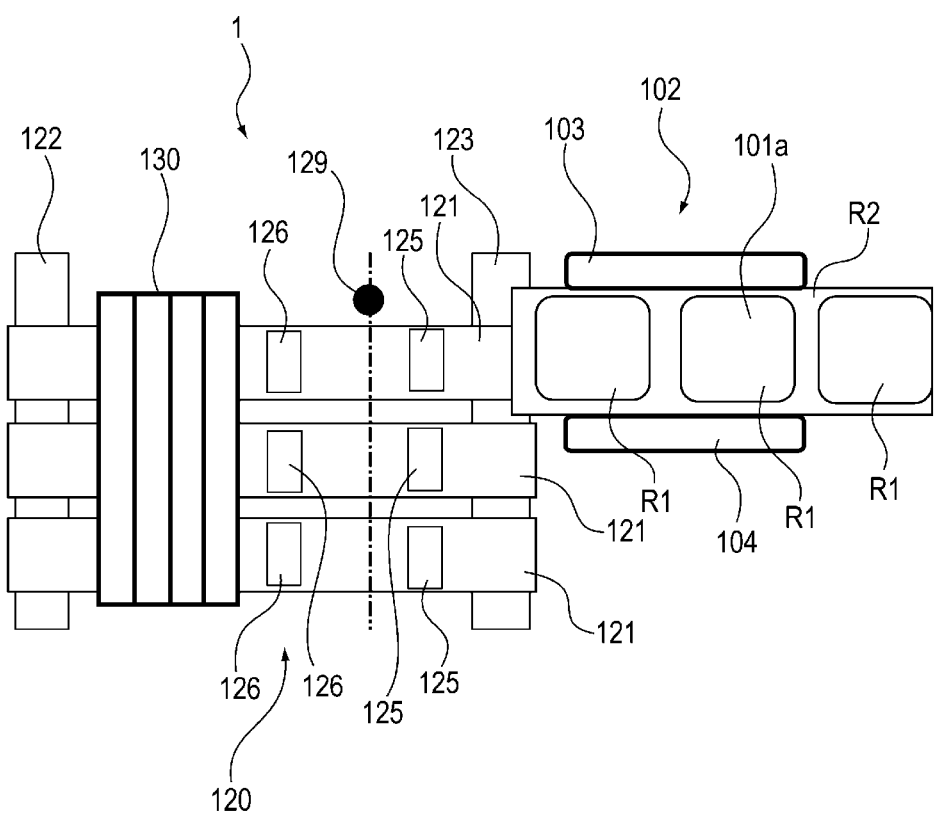
FIG. 5 is a plan view schematically showing a conveying apparatus according to the first embodiment of the present invention.

Specifically, as shown in FIGS. 4 and 5, the guide unit 102 includes the fixed guide 103, the movable guide 104, the frame 105, and the volume sensor 180 (see FIG. 2). The guide unit 102 regulates the movement of the roll paper 101 in the width direction by the position of the movable guide 104 being changed according to the width of the roll paper 101 fed on the movable guide 104 with the fixed guide 103 as a reference side. The volume sensor 180 (see FIG. 2) is provided on the back side of the frame 105, and outputs a signal of a resistance value varied in accordance with the movement of the movable guide 104 to the CPU 150a of the control portion 150.

In the feeding unit 110 as a holding unit, the roll paper 101 is housed in a state in which the roll paper 101 is rotatable. The feeding unit 110 feeds the roll paper 101 housed therein to the conveying unit 120 via the guide unit 102. More specifically, the feeding unit 110 has a spool shaft (not shown) and the torque limiter 111 (see FIG. 3).

The spool shaft is rotatably provided in the feeding unit 110 for holding the roll paper 101.

The torque limiter 111 as a load applying member generates a torque in the direction opposite to the rotation direction and the conveying direction of the roll paper 101 when the roll paper 101 held by the spool shaft is unwound, and applies a load to the roll paper 101. As a result, the torque limiter 110 suppresses a rotational inertia force generated when the rotation of the fed-out roll paper 101 is stopped.

The conveying unit 120 conveys the roll paper 101 fed while being guided by the guide unit 102 to a label area opposite to the recording head 130. Specifically, the conveying unit 120 has the conveying belt (drive belt) 121, the drive pulley 122, the driven pulley 123, the driven pulley 124, the upstream nip roller 125, the downstream nip roller 126, the platen 127, and the support roller 128.

The upstream side nip roller 125 (first rotating body) and the conveying belt 121 constitute a first nipping and conveying unit, and the downstream side nip roller 126 (second rotating body) and the conveying belt 121 constitute a second nipping and conveying unit. The downstream side nip roller 126 is disposed on the downstream side of the upstream side nip roller 125 in the conveying direction of the roll paper 101. The downstream side nip roller 126 nips and conveys, with the opposing conveying belt 121, the roll paper 101 which is nipped and conveyed by the upstream side nip roller 125 and the conveying belt 121 to a label area opposed to the recording head 130.

The conveying belt (drive belt) 121 is wound around the drive pulley 122, the driven pulley 123 and the driven pulley 124 and is rotated by the drive pulley 122 to convey the roll paper 101 placed thereon, which is fed from the feeding unit 110. In this embodiment, as shown in FIG. 5, a plurality of conveying belts 121 are provided in the width direction orthogonal to the conveying direction (sheet conveying direction) of the roll paper 101, and are arranged along the width direction. Three conveying belts 121 are used in this embodiment.

The drive pulley 122 is connected to the conveying motor 170 (see FIG. 2), and drives the conveying belt 121 by being driven by the conveying motor 170.

The driven pulley 123 rotates by being driven by the conveying belt 121.

The driven pulley 124 rotates by being driven by the conveying belt 121.

The upstream side nip roller 125 (first rotating body) is provided on the downstream side of the driven pulley 123 of the conveying belt 121 and on the upstream side of the detecting position for detecting the leading end of the conveyed roll paper 101 of the leading end detecting sensor 129 in the conveying direction of the roll paper 101. The upstream-side nip roller 125 is a driven roller that is driven to rotate while being in contact with the conveying belt 121 as a drive belt. The roll paper 101 is nipped and conveyed in the conveying direction by the upstream-side nip roller 125 and the conveying belt 121. The upstream side nip roller 125 presses the conveying belt 121 in the direction of the arrow A in FIG. 3. As shown in FIG. 5, the same number of upstream side nip rollers 125 are provided as that of the plurality of conveying belts 121 provided in the width direction orthogonal to the conveying direction of the roll paper 101. Each of the upstream side nip rollers 125 presses the respective conveying belt 121 at the pressing position (nipping position).

The downstream side nip roller (second rotating body) 126 is provided on the downstream side of the detecting position of the leading end detection sensor 129 and on the upstream side of the recording head 130 in the conveying direction of the roll paper 101. The downstream side nip roller 126 presses the roll paper 101 toward the conveying belt 121, thereby suppressing the contact between the recording head 130 and the roll paper 101. The downstream side nip roller 126 is a driven roller that is driven to rotate while being in contact with the conveying belt 121 as a drive belt. The roll paper 101 is nipped and conveyed in the conveying direction by the downstream side nip roller 126 and the conveying belt 121. The upstream side nip roller 126 presses the conveying belt 121 in the direction of the arrow A in FIG. 3. As shown in FIG. 5, the same number of upstream side nip rollers 126 are provided as that of the plurality of conveying belts 121 provided in the width direction orthogonal to the conveying direction of the roll paper 101. Each of the upstream side nip rollers 126 presses the respective conveying belt 121.

The platen 127 is provided inside the conveying belt 121 and supports the conveying belt 121 in the label area opposite to the recording head 130.

The support roller 128 as a driven roller is disposed opposite to each of the upstream side nip roller 125 and the downstream side nip roller 126 via the conveying belt 121. The support roller 128 suppresses the displacement of the conveying belt 121 due to the pressing of the upstream side nip roller 125 and the downstream side nip roller 126 in the arrow A direction. Therefore, the support roller 128 is a mold roller having high hardness.

The conveying unit 120 of the above-explained configuration nips and conveys the roll paper 101 by the conveyance belts 121, the upstream side nip rollers 125 and the downstream side nip rollers 126. The number of the conveyance belts 121, the upstream side nip rollers 125 and the downstream side nip rollers 126 which nip and convey the roll paper 101 corresponds to the size of the roll paper 101 in the width direction. For example, when conveying the roll paper 101a of the minimum size width shown in FIG. 5, the conveying unit 120 nips and conveys the roll paper 101 by the single conveying belt 121, the single upstream side nip roller 125 and the single downstream side nip roller 126. At this time, a conveying force is applied to the roll paper 101a by the single upstream nip roller (first rotating member) 125 and the single downstream nip roller (second rotating member) 126, respectively.

A detecting position of the leading end detecting sensor 129 as a detecting unit is provided between the upstream side of the nipping position of nip roller (first rotating body) 125 and the downstream side the nipping position of nip roller (second rotating body) 126. When the leading end of the roll paper 101 conveyed by the conveying belt 121 passes through the detecting position of the leading end detecting sensor 129, the leading end detecting sensor 129 detects the leading end of the roll paper 101 and outputs a detection result to the CPU 150a.

The CPU 150a of the control portion 150 controls the conveying speed of the roll paper (sheet portion) 101 by detecting an amount of the movement of the conveying belt 121 based on a signal input from the photo sensor 190 which detects a rotational signal of the encoder 160 which will be described later. The CPU 150a detects the size of the roll paper 101 in the width direction by detecting the position of the movable guide 104 based on a resistance value in a signal input from the volume sensor 180 of the guide unit 102. The CPU 150a receives recording data, commands, or the like transmitted from the personal computer 140.

The CPU 150a controls the operation of the feeding unit 110 and the conveying unit 120 based on the received recording data and commands, the signal input from the leading end detecting sensor 129, the detected amount of the movement of the conveying belt 121, and the size in the width direction of the roll paper 101. The CPU 150a also controls the timing of ink ejection or the like of the recording head 130 as a recording unit based on the received recording data and commands, the signal input from the leading end detecting sensor 129 as a detecting unit, and the signal input from the photo sensor 190 which detects the rotational signal.

The encoder 160 is a rotary encoder that is fixed coaxially with the driven pulley 124 which is driven to rotate by the driven conveying belt 121. The encoder 160 rotates with the driven pulley 124. The encoder 160 is provided with an encoder scale disk (not shown) on which the scale in the rotation direction is provided.

The rotational speed of the conveying motor 170 is changed under the control of the CPU 150a of the control portion 150 to drive the drive pulley 122. Accordingly, the speed of the conveying belt 121 is changed, thereby changing the conveying speed of the roll paper 101 which is being conveyed.

The photo sensor 190 (see FIG. 2) detects passage of the scale on the encoder scale disk of the encoder 160 and outputs to the CPU 150a a signal corresponding to the number of notches (pulses) of the scale that have passed through.

<Force Acting on Roll Paper>

The force acting on the roll paper 101 according to the first embodiment of the present invention will be described.

The conveying force F acting in the conveying direction and the back tension T acting in the direction opposite to the conveying force F are imparted to the conveyed roll paper 101.

Given that the pressing force of the upstream side nip roller 125 in the direction of arrow A in FIG. 3 is N1, the pressing force of the downstream side nip roller 126 in the direction of arrow A shown in FIG. 3 is N2, and the friction coefficient between the roll paper 101 and the conveying belt 121 is μ, the conveying force F can be obtained from the following equation (1).

$$F = N1 \times \mu + N2 \times \mu \quad (1)$$

From equation (1), it is understood that the conveying force F increases as the pressing force N1 of the upstream nip roller 125 in the direction of the arrow A or the pressing force N2 of the downstream nip roller 126 in the direction of the arrow A increases. Further, the back tension T is the sum of the torque limiter tension generated by the torque limiter 111 and the tension generated by the inertia force of the roll paper 101. The inertia force of the roll paper 101 increases as the acceleration during the conveyance of the roll paper 101 increases.

When the back tension T is large with respect to the conveying force F, there is a possibility that deviation from the target conveying amount of the roll paper 101 may occur. Therefore, in order to perform the conveyance with high accuracy, it is necessary to increase the conveying force F with respect to the back tension T.

On the other hand, when the pressing force N1 in the direction of the arrow A of the upstream nip roller 125 or the pressing force N2 in the direction of the arrow A of the downstream nip roller 126 is excessively increased in order to increase the conveying force F, damage to the recording surface of the roll paper 101, which is in contact with the upstream nip roller 125 or the downstream nip roller 126 increases. In the case where the roll paper 101 is a label sheet with release paper, when the pressing force N1 in the direction of the arrow A of the upstream side nip roller 125 is excessively increased, due to the bump between the label area R1 where the label of the roll paper 101 exists and the non-label area R2 where no label is present, the large impact is applied to the roll paper 101. Similarly, in the case where the roll paper 101 is a label sheet with release paper, when the pressing force N2 in the direction of the arrow A of the downstream side nip roller 126 is excessively increased, due to the bump between the label area R1 where the label of the roll paper 101 exists and the non-label area R2 where no label is present, the large impact is applied to the roll paper 101. As a result, a vibration occurs on the roll paper 101 during recording, and the quality of the image recorded on the roll paper 101 decreases.

For this reason the upstream side nip roller 125 and the downstream side nip roller 126 are preferably made of a material having low hardness in order to reduce the vibration of the roll paper 101 as much as possible. Therefore, it is preferable that the upstream side nip roller 125 and the downstream side nip roller 126 is not a roller having high hardness such as a mold roller, but a roller having low hardness with a foamed layer such as a sponge roller.

<Operation of Recording Apparatus>

Figure 6:
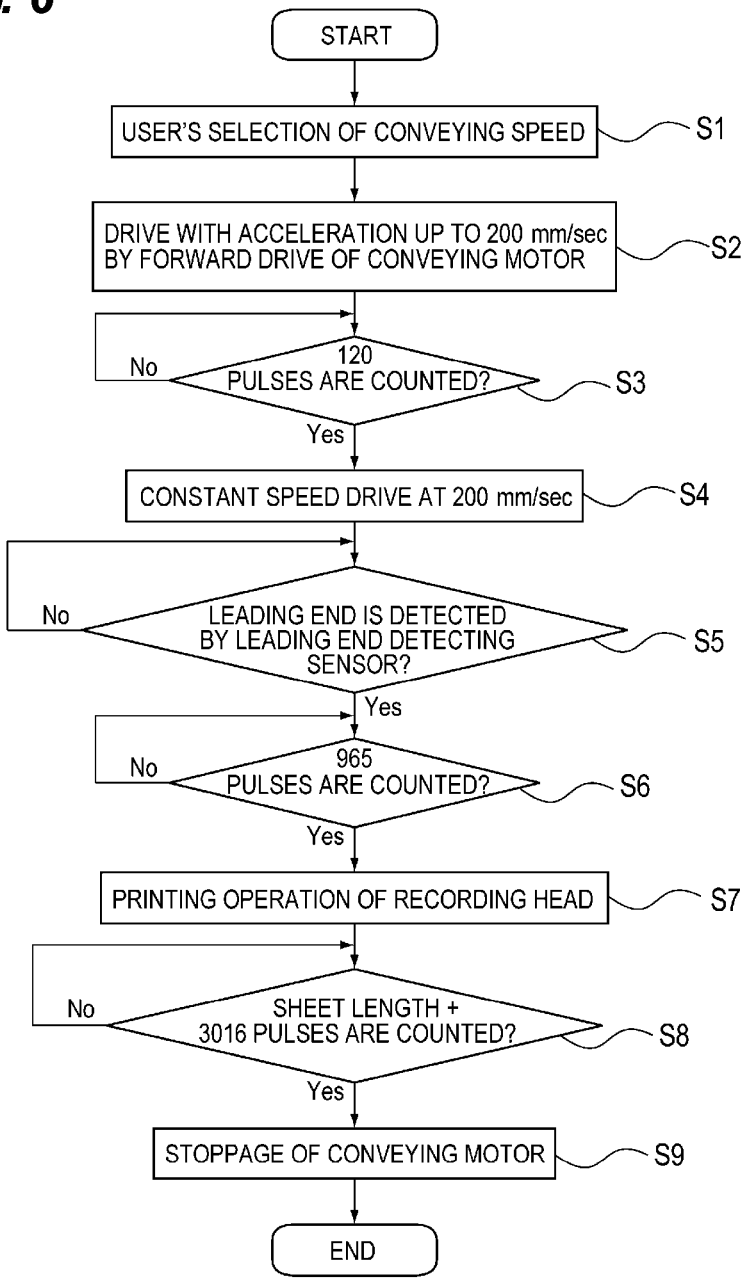
FIG. 6 is a flow chart showing an operation when a roll paper is conveyed at a low speed by the conveying apparatus according to the first embodiment of the present invention.
Figure 7:
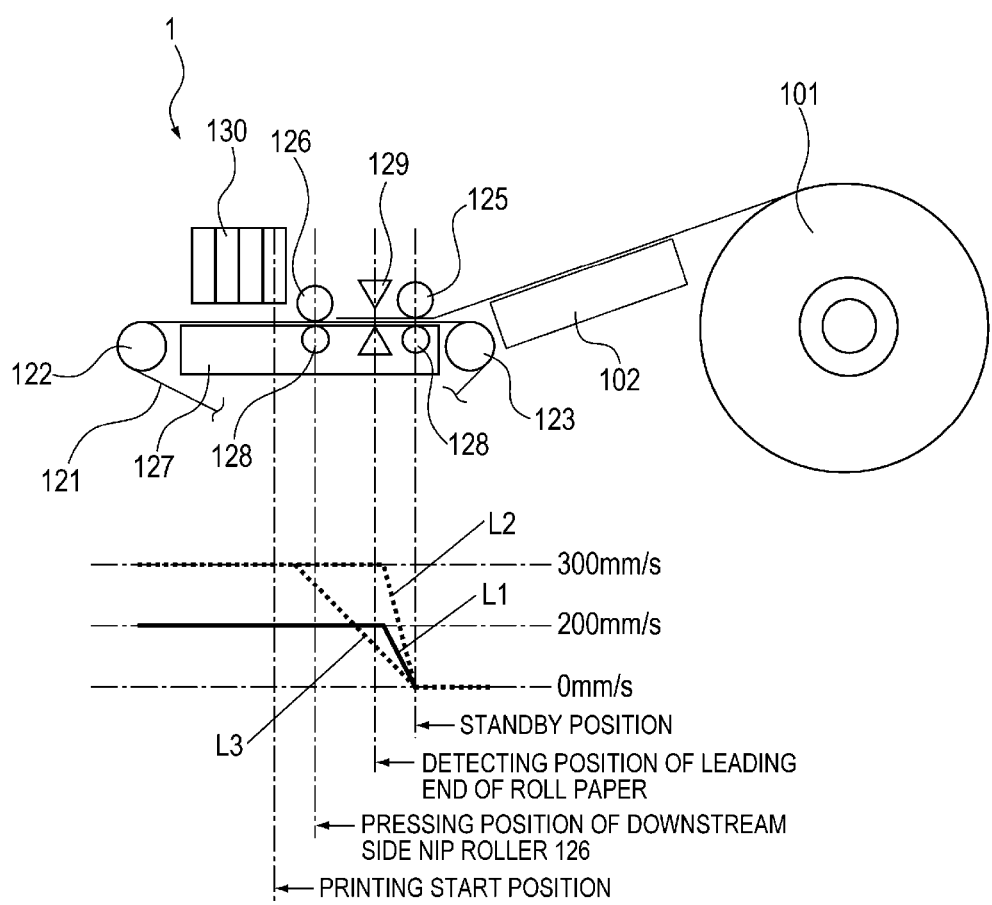
FIG. 7 is a diagram showing a transition of the speed of the roll paper when the roll paper is conveyed by the conveying apparatus according to the first embodiment of the present invention.
Figure 8:
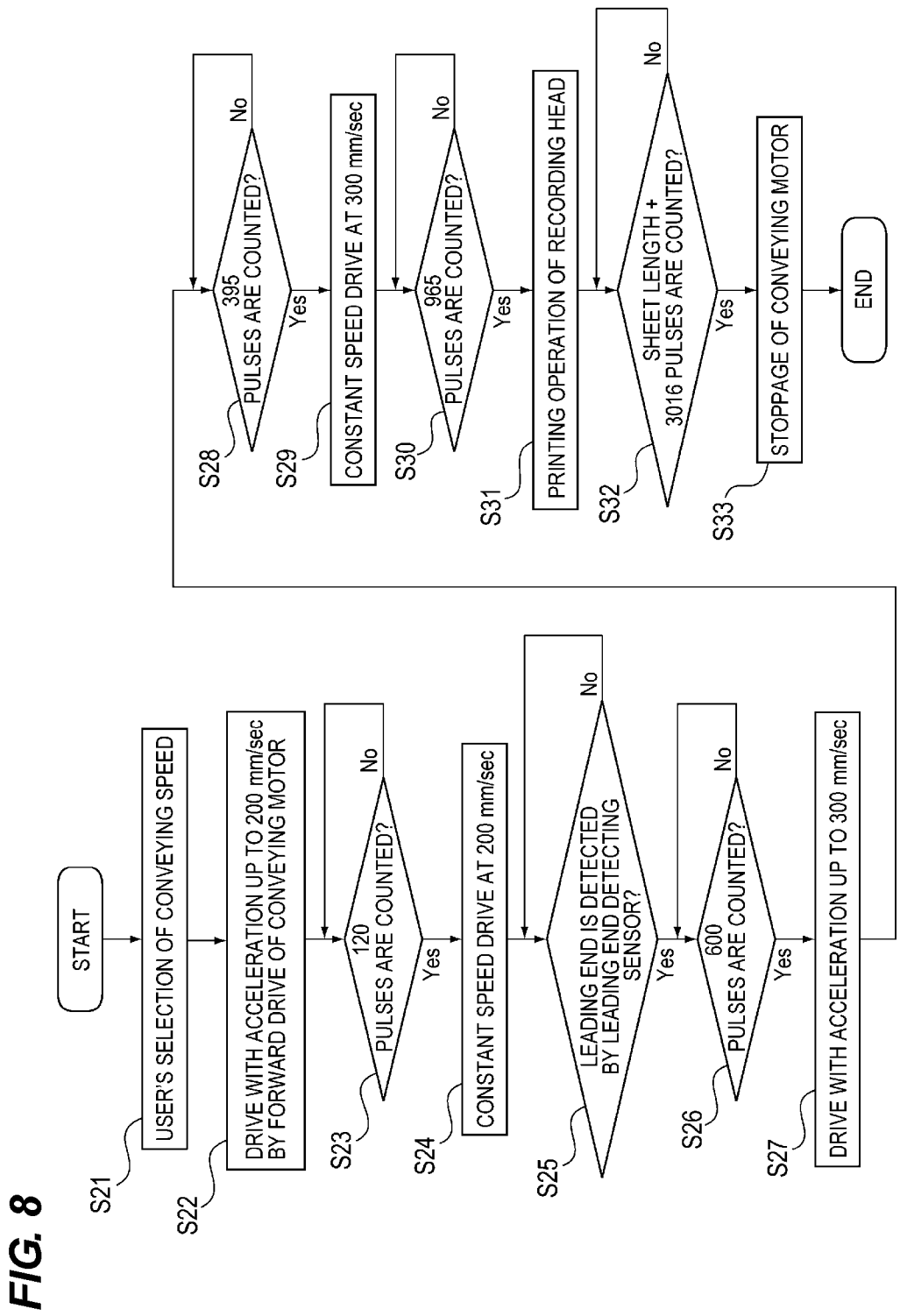
FIG. 8 is a flow chart showing an operation when a roll paper is conveyed at a high speed by the conveying apparatus according to the first embodiment of the present invention.

The operation of the recording apparatus 100 according to the first embodiment of the present invention will be described in detail with reference to FIGS. 6 to 9. FIG. 6 is a flow chart showing an operation when a roll paper is conveyed at a low speed by the conveying apparatus according to the first embodiment of the present invention, and FIG. 7 is a diagram showing a transition of the speed of the roll paper when the roll paper is conveyed by the conveying apparatus according to the first embodiment of the present invention. FIG. 8 is a flow chart showing an operation when the roll paper is conveyed at a high speed by the conveying apparatus according to the first embodiment of the present invention, and FIG. 9 is a diagram showing a transition of the speed of the roll paper when the roll paper is conveyed at a high speed by the conveying apparatus according to the first embodiment of the present invention.

The recording apparatus 100 according to the first embodiment of the present invention has a recording operation (first mode) with high-speed conveyance for improving productivity and a recording operation (second mode) with low speed conveyance for giving priority to image quality. In recording apparatus 100, one of these modes can be selected with the personal computer 140 connected to the recording apparatus 100 or with an operation portion (not shown) provided in the recording apparatus 100. When the first mode is selected, the sheet portion of the roll paper is recorded while being conveyed at a high speed, and the number of recordings per unit time is increased. Therefore, the productivity is improved. On the other hand, when the second mode is selected, the sheet portion of the roll paper is recorded while being conveyed at a low speed and the number of recordings per unit time decreases. However, an image with high accuracy is formed and the image quality is improved.

Figure 9:
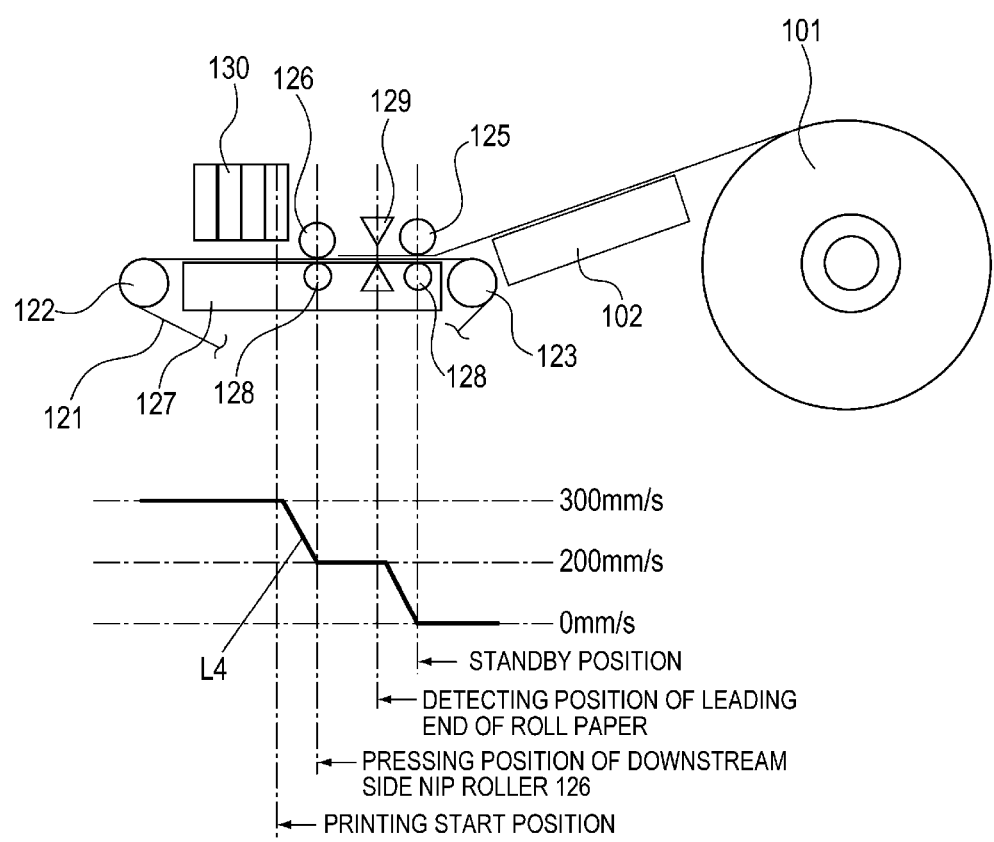
FIG. 9 is a diagram showing a transition of the speed of the roll paper when the roll paper is conveyed at a high speed by the conveying apparatus according to the first embodiment of the present invention.

In FIGS. 7 and 9, the standby position of the roll paper (sheet portion) 101 is located between the nipping position of the upstream side nip roller (first rotating body) 125 and the detecting position of the leading end detecting sensor 129. The leading end of the rolled paper 101 is located at the standby position when waiting. When the roll paper 101 is set by a user, the roll paper 101 is conveyed by the upstream side nip roller 125. After the leading end of the roll paper 101 is detected by the leading end detecting sensor 129, the upstream side nip roller 125 is reversely rotated and the leading end of the roll paper 101 is returned to the standby position where the roll paper 101 is in a standby state. The detecting position of the leading end of the roll paper is a position where the leading end of the roll paper 101 is detected by the leading end detecting sensor 129. The pressing position (nipping position) of the downstream side nip roller 126 is a position where the roll paper is pressed by the downstream side nip roller 126. The printing start position is a position where the recording on the roll paper 101 located in the label area is started by the recording head 130 as a recording unit.

First, with reference to FIGS. 6 and 7, the operation of the recording apparatus 100 in the case where the conveying apparatus 1 conveys the roll paper (sheet portion) 101 at a conveying speed lower than a predetermined speed (low speed conveyance) in the second mode will be explained.

The CPU 150a of the control portion 150 of the recording apparatus 100 starts the operation shown in FIG. 6 by receiving recording data and commands transmitted from the personal computer 140.

First, when a user inputs data concerning the selection of the conveying speed on the personal computer 140 (step S1), the CPU 150a receives from personal computer 140 the recording data and the commands concerning the conveying speed set by a user. Here, the conveying speed set by a user is less than a predetermined speed. In this embodiment, the set conveying speed is exemplified as 200 mm/sec. Also, the predetermined speed is exemplified as 300 mm/sec.

Next, when the CPU 150a has received the commands, the recording data, etc., the CPU 150a drives the conveying motor 170 of the conveying unit 120 in the forward direction to accelerate the drive pulley 122 and the conveying belt 121 and to accelerate the roll paper 101 to the set conveying speed (step S2).

When the second mode (low speed conveyance) is set, as indicated by L1 in FIG. 7, the CPU 150a accelerates the roll paper 101 whose leading end is stopped at the standby position to the set speed of a first predetermined speed of 200 mm/sec (low speed conveyance).

At this time, the roll paper 101 is nipped and conveyed by the upstream side nip roller (first rotating member) 125, so that the pressing force N1 is applied to the roll paper 101 by the upstream side nip roller 125. Further, the conveying speed of the roll paper 101 is increased in a state where the pressing force N1 is applied to the roll paper 101.

In this way, when the set conveying speed is less than the predetermined speed (low speed conveying), the CPU 150a of the control portion 150 accelerates the roll paper 101 with the upstream side nip roller 125 (the first rotating body) to the set conveying speed. In the first acceleration period required for this acceleration, the leading end of the roll paper 101 reaches the first predetermined speed of 200 mm/sec (low speed conveyance) before reaching the detecting position.

Next, the CPU 150a determines whether or not a predetermined number of pulses has been counted, which is required for the leading end of the roll sheet 101 to be conveyed from the standby position to a position before the detecting position (step S3). In this case, the predetermined number of pulses is exemplified as 120. In this case, the conveying distance from the standby position is exemplified as, for example, 15 mm.

When the CPU 150a has not counted the predetermined number of pulses (step S3: No), the CPU 150a repeats the operation of step S2.

On the other hand, when the CPU 150a has counted the predetermined number of pulses (step S3: Yes), the CPU 150a controls the conveying motor 170 to drive the conveying belt 121 at a constant speed, so that the roll paper 101 is conveyed at the set constant conveying speed (step S4). The first constant speed period in which the CPU 150a performs the constant speed conveyance is a period in which the roll paper 101 is conveyed at the conveying speed of the first predetermined speed before the leading end of the roll paper 101 (the sheet portion) reaches the detecting position until when the leading end of the roll paper 101 is nipped by the conveying belt 121 and the downstream side nip roller 126 (second rotating body). As a result, the roll paper 101 is conveyed at the set conveying speed to a recording region which is opposed to the recording head 130.

For example, as indicated by L1 in FIG. 7, the CPU 150a conveys the roll paper 101 at the constant speed of 200 mm/sec when the predetermined number of pulses is counted and the leading end of the roll paper 101 reaches a position before the detecting position.

Next, the CPU 150a determines whether or not the leading end of the roll paper 101 is detected by the leading end detecting sensor 129 based on the input signal from the leading end detecting sensor 129 in a state in which the conveying belt 121 is driven at a constant speed (step S5).

When the CPU 150a does not detect the leading end of the roll paper 101 (step S5: No), the CPU 150a repeats the operation of step S5.

On the other hand, when detecting the leading end of the roll paper 101 (step S5: Yes), the CPU 150a determines whether or not the predetermined number of pulses has been counted, which is required for the leading end of the roll paper 101 to be conveyed from the detecting position for the leading end of the roll paper 101 to the printing start position (step S6). In this case, the predetermined number of pulses is exemplified as 965. Further, the conveying distance from the detecting position for the leading end of the roll paper to the printing start position is exemplified as 48 mm.

When the CPU 150a has not counted the predetermined number of pulses (step S6: No), the CPU 150a repeats the operation of step S6.

On the other hand, when the CPU 150a has counted the predetermined number of pulses (step S6: Yes), the CPU 150a starts the printing operation with the recording head 130 (step S7). In the second mode, the conveying speed is the first predetermined speed when recording is performed on the sheet portion by the recording unit.

Next, the CPU 150a determines whether or not the number of pulses has been counted which is the summation of the predetermined number of pulses required for the leading end of the roll paper 101 to be conveyed from the detecting position for leading end of the roll paper to the cutting position where the roll paper 101 is cut and the number of pulses corresponding to the length of the sheet of the roll paper 101 (step S8). In this case, the predetermined number of pulses is exemplified as 3016. The conveying distance from the detecting position for the leading end of the roll paper to the cutting position is exemplified as 142 mm. Here, the "length of the sheet" is the length of the label area R1 on the roll paper 101 in the conveying direction.

When the number of pulses which is the summation of the number of pulses corresponding to the length of the sheet of the roll paper 101 and the predetermined number of pulses has not been counted (step S8: No), the CPU 150a repeats the operation of step S8.

On the other hand, when the CPU 150a has counted the number of pulses which is the summation of the predetermined number of pulses and the number of pulses corresponding to the length of the sheet of the roll paper 101 (step S8: Yes), the CPU 150a stops the printing operation of the recording head 130. Then, the CPU 150a stops the conveying motor 170 (step S9), and then stops the printing operation.

The CPU 150a maintains the state of the constant speed drive in step S5 until the printing operation is completed. For example, as indicated by L1 in FIG. 7, the CPU 150a maintains, until the printing operation is completed, the state in which the roll paper 101 is conveyed at the constant speed of 200 mm/sec at the detecting position.

In this manner, the CPU 150a of the control portion 150 sets the acceleration period in which the back tension T becomes large before the detecting position where the leading end of the rolled sheet (sheet portion) is detected by the leading end detection sensor 129. After that, the CPU 150a conveys the roll paper 101 at a set constant speed. The back tension T acting on the roll paper 101 during the constant speed conveyance is only the torque limiter tension generated by the torque limiter 111 since the angular acceleration of the roll paper 101 becomes zero, so that the inertia force of the roll paper 101 becomes zero. As a result, it is possible to suppress a deviation in the conveying amount after the leading end of the roll sheet 101 is detected by the leading end detecting sensor 129.

Next, each of L2 and L3 in FIG. 7 indicates a transition of a conveying speed in the case where the conveying speed is 300 mm/sec (high speed conveyance) which is higher than the set conveying speed of 200 mm/sec and the roll paper 101 is continuously accelerated up to 300 mm/sec.

In the case of L2 in FIG. 7, the conveying motor 170 may become out of step since the acceleration period in which the conveying speed is accelerated to the set conveying speed of 300 mm/sec is placed before the detecting position, so that the load on the conveying motor 170 for driving the conveying belt 121 increases. Further, the pressing force N1 applied by the upstream side nip roller 125 in the direction of the arrow A is not changed.

Therefore, there is a possibility that the conveying speed may not reach 300 mm/sec before the roll paper 101 passes through the leading end detecting sensor 129 due to slippage of the roll paper 101 because a force for nipping the roll paper 101 by the upstream side nip roller 125 and the conveying belt 121 is insufficient.

In the case of L3 in FIG. 7, the acceleration is suppressed. As a result, the tension force due to the inertia force of the roll paper 101 is reduced. However, the leading end of the roll paper 101 passes through the detecting position of the leading end detecting sensor 129 during acceleration. Accordingly, even if the roll paper 101 slips while being accelerated to 300 mm/sec, this cannot be detected after the leading end of the roll paper 101 passes through the detecting position of the leading end detecting sensor 129. Therefore, there is a possibility that a deviation may occur with respect to the target conveying amount.

Next, the operation of the recording apparatus 100 when the first mode is selected in the conveying apparatus 1 according to the first embodiment of the present invention will be described with reference to FIGS. 8 and 9. In the first mode, the roll paper (sheet portion) 101 is conveyed at the second predetermined speed (high speed conveyance).

When the CPU 150a of the control portion 150 of the recording apparatus 100 has received the recording data, commands, and the like transmitted from the personal computer 140, the CPU 150a starts the operation shown in FIG. 8.

First, when a user inputs data concerning the selection of the conveying speed on the personal computer 140 (step S21), the CPU 150a receives from personal computer 140 the recording data and the commands concerning the conveying speed set by a user. Here, the conveying speed in the second mode set by a user is a second predetermined speed. The set conveying speed is for high speed conveyance; the speed at which the recording unit performs recording during conveyance is exemplified as 300 mm/sec.

Next, when the CPU 150a has received the commands, the recording data, etc., the CPU 150a drives the conveying motor 170 of the conveying unit 120 in the forward direction to accelerate the drive pulley 122 and the conveying belt 121 and accelerates the roll paper 101 to a first stage conveying speed (step S22). The first stage conveying speed is exemplified as 200 mm/sec here.

For example, as shown by L4 in FIG. 9, the CPU 150a accelerates the roll paper (sheet portion) 101 whose leading end is stopped at the standby position until the roll paper (sheet portion) 101 reaches the first stage conveyance speed (first predetermined speed) of 200 mm/sec before the leading end of the recording sheet which is nipped and conveyed by the upstream side nip roller 125 and the conveying belt 121, which constitute a first nipping and conveying unit, is detected by the leading end detecting sensor 129 as a detecting unit. Here, the standby position is located downstream of the nipping position between the upstream side nip roller 125 and the conveying belt 121, and upstream of the detection position of the leading end detecting sensor 129.

At this time, the roll paper 101 is nipped and conveyed by the upstream side nip roller 125, so that the pressing force N1 is applied to the roll paper 101 by the upstream side nip roller 125. Further, the conveying speed of the roll paper 101 is increased in a state where the pressing force N1 is applied to the roll paper 101.

Next, the CPU 150a determines whether or not a predetermined number of pulses has been counted, which is required for the leading end of the roll sheet 101 to be conveyed to a position before the detecting position (step S23). In this case, the predetermined number of pulses is exemplified as 120. In this case, the conveying distance from the standby position is exemplified as, for example, 15 mm.

When the CPU 150a has not counted the predetermined number of pulses (step S23: No), the CPU 150a repeats the operation of step S23.

On the other hand, when the CPU 150a has counted the predetermined number of pulses (step S23: Yes), the CPU 150a controls the conveying motor 170 to drive the conveying belt 121 at a constant speed, so that the roll paper 101 is conveyed at the constant first stage conveying speed (first predetermined speed)(step S24).

For example, as indicated by L4 in FIG. 9, the CPU 150a conveys the roll paper 101 at the constant speed of 200 mm/sec when the predetermined number of pulses is counted and the leading end of the roll paper 101 reaches a position before the detecting position.

As described above, the CPU 150a of the control portion 150 performs a control such that the roll paper 101 is conveyed at a constant speed when the leading end of the roll paper 101 passes through the detecting position of the leading end detecting sensor 129 before the conveying speed reaches the set conveying speed (300 mm/sec). When the leading end of the roll paper is detected by the leading end detecting sensor 129, the roll paper is conveyed at a constant speed, so that the detection with high precision can be obtained. The control of the conveyance so far is the same as that of the above-described second mode. The constant speed period in which the CPU 150a performs the constant speed conveyance is a period in which the roll paper 101 (the sheet portion) is conveyed at the constant speed of the first predetermined speed before the leading end of the roll paper 101 reaches the detecting position until the leading end of the roll paper 101 is nipped by the conveying belt 121 and the downstream side nip roller 126 (second rotating body).

Next, the CPU 150a determines whether or not the leading end of the roll paper 101 is detected by the leading end detecting sensor 129 based on the input signal from the leading end detecting sensor 129 in a state in which the conveying belt 121 is driven at a constant speed (step S25).

When the CPU 150a does not detect the leading end of the roll paper 101 (step S25: No), the CPU 150a repeats the operation of step S25.

On the other hand, when detecting the leading end of the roll paper 101 (step S25: Yes), the CPU 150a determines whether or not the predetermined number of pulses has been counted, which is required for the leading end of the roll paper 101 to be conveyed to the pressing position (step S26). In this case, the predetermined number of pulses is exemplified as 600. Further, the conveying distance from the detecting position to the pressing position of the downstream side nip roller 126 is exemplified as 25 mm.

When the CPU 150a has not count the predetermined number of pulses (step S26: No), the CPU 150a repeats the operation of step S26.

On the other hand, when the CPU 150a has counted the predetermined number of pulses (step S26: Yes), the CPU 150a controls the conveying motor 170 to accelerate the conveying belt 121 to the set conveying speed, so that the roll paper 101 is accelerated again to the set conveying speed (step S27). The set conveying speed here is the second predetermined speed.

For example, as shown by L4 in FIG. 9, the CPU 150a accelerates, until the conveying speed reaches 300 mm/sec, the roll paper 101 whose leading end reaches the nipping position which is the pressing position of the downstream side nip roller 126 constituting the second nipping and conveying unit when the predetermined number of pulses has been counted. This acceleration period is the second acceleration period in which the roll paper 101 is accelerated after the leading end of the roll paper 101 is nipped by the second nipping and conveying unit before the recording by the recording unit is started.

At this time, the roll paper 101 is nipped and conveyed by the upstream side nip roller 125 and the downstream side nip roller 126, so that not only the pressing force N1 is applied to the roll paper 101 by the upstream side nip roller 125 but also the pressing force N2 is applied to the roll paper 101 by the downstream side nip roller 126. Further, the conveying speed of the roll paper 101 is increased in a state where the pressing force N1 and the pressing force N2 are applied to the roll paper 101.

As explained above, the CPU 150a of the control portion 150 performs the first mode in which the roll paper 101 is accelerated in a stepwise fashion up to the set conveying speed.

Next, the CPU 150a determines whether or not a predetermined number of pulses has been counted, which is required for the leading end of the roll sheet 101 to be conveyed from the detecting position to a position before the printing start position (step S28). In this case, the predetermined number of pulses is exemplified as 395. In this case, the conveying distance from the detecting position is exemplified as, for example, 31.6 mm.

When the CPU 150a has not counted the predetermined number of pulses (step S28: No), the CPU 150a repeats the operation of step S28.

On the other hand, when the CPU 150a has counted the predetermined number of pulses (step S28: Yes), the CPU 150a controls the conveying motor 170 to drive the conveying belt 121 at a constant speed, so that the roll paper 101 is conveyed at the set conveying speed (second predetermined speed)(step S29). As a result, the roll paper 101 is conveyed to the recording head 130 at the predetermined speed.

For example, as shown by L4 in FIG. 9, the CPU 150a conveys, at the set constant conveying speed of 300 mm/sec, the roll paper 101 whose leading end reaches a position before the printing start position when the predetermined number of pulses has been counted. The second constant speed period in which the CPU 150a performs the constant speed conveyance of the roll paper 101 with the second predetermined speed is a period in which the roll paper 101 is conveyed at the constant speed of the second predetermined speed until the leading end of the roll paper 101 (the sheet portion) reaches the recording position at the recording unit performs the recording.

Next, the CPU 150a determines whether or not a predetermined number of pulses has been counted, which is required for the leading end of the roll sheet 101 to be conveyed from the detecting position to the printing start position (step S30). In this case, the predetermined number of pulses is exemplified as 965. In this case, the conveying distance from the detecting position to the printing start position is exemplified as, for example, 48 mm.

When the CPU 150a has not counted the predetermined number of pulses (step S30: No), the CPU 150a repeats the operation of step S30.

On the other hand, when the CPU 150a has counted the predetermined number of pulses (step S30: Yes), the CPU 150a starts the printing operation of the recording head 130 (step S31). In the first mode, the conveying speed is the second predetermined speed when recording is performed on the sheet portion by the recording unit.

Next, the CPU 150a determines whether or not the number of pulses has been counted which is the summation of the predetermined number of pulses required for the leading end of the roll paper 101 to be conveyed from the detecting position to the cutting position and the number of pulses corresponding to the length of the sheet (label length) of the roll paper 101 (step S32). In this case, the predetermined number of pulses is exemplified as 3016. The conveying distance from the detecting position to the cutting position is exemplified as 142 mm. Here, the "length of the sheet" is the length of the label area R1 on the roll paper 101 in the conveying direction.

When the CPU 150a has counted the number of pulses which is the summation of the predetermined number of pulses and the number of pulses corresponding to the length of the sheet of the roll paper 101 (step S32: Yes), the CPU 150a stops the printing operation of the recording head 130. Then, the CPU 150a stops the conveying motor 170 (step S33), and then stops the printing operation.

The CPU 150a maintains the state of the constant speed drive in step S29 until the printing operation is completed. For example, as indicated by L4 in FIG. 9, the CPU 150a maintains, until the printing operation is completed, the state in which the roll paper 101 is conveyed at the constant speed of 300 mm/sec.

As described above, in this embodiment, every time the number of the upstream nip roller 125 and the downstream nip roller 126 which nip the roll paper 101 is increased, the conveying speed of the roll paper 101 is increased with the upstream nip roller 125 and the downstream nip roller 126 in a stepwise fashion and the roll paper 101 is accelerated to a predetermined speed (a first acceleration period and a second acceleration period). As a result, even if a back tension occurs in a recording operation while the roll paper 101 is being conveyed, it is possible to convey the roll paper 101 with high accuracy without reducing productivity.

In the present embodiment, a constant speed period (first constant speed period) is provided between the speed stepwise increase periods. In the constant speed period, the roll paper 101 is conveyed at a constant speed when the leading end of the roll paper 101 passes through the detecting position of the leading end detecting sensor 129. This constant speed period is provided for increasing the detecting precision of the leading end detecting sensor 129 which detects the leading end of the roll paper serving as a reference for controlling an ink ejection timing of the recording head 130 and a cutting operation. Therefore, in the present embodiment, the conveying speed is increased in a stepwise fashion such that the roll paper 101 reaches a predetermined speed after the downstream side nip roller 126 nips the roll paper 101 after the roll paper 101 is conveyed at a constant speed at the detecting position of the leading end detecting sensor 129.

In the present embodiment, however, the passing speed of the detecting position of the roll paper 101 is not limited to a constant speed, and the roll paper 101 can be conveyed at the detecting position with a low acceleration depending on the performance of the leading end detecting sensor 129. In this case, the roll paper 101 can be accelerated in a stepwise fashion such that the roll paper 101 is conveyed with a high acceleration until the roll paper 101 reaches the set conveying speed after the downstream side nip roller 126 nips the roll paper 101.

In the present embodiment, the first mode of high speed conveyance in which acceleration is performed in two stages and the second mode of low speed conveyance in which stepwise acceleration is not performed are selectable, but the accelerating mode can be fixed to the two-step acceleration without mode selection function.

Second Embodiment

The configurations of the recording apparatus and the conveying apparatus according to the second embodiment of the present invention are the same as those of FIGS. 1 to 5. Therefore, the description thereof will be omitted.

<Operation of Recording Apparatus>

Figure 10:
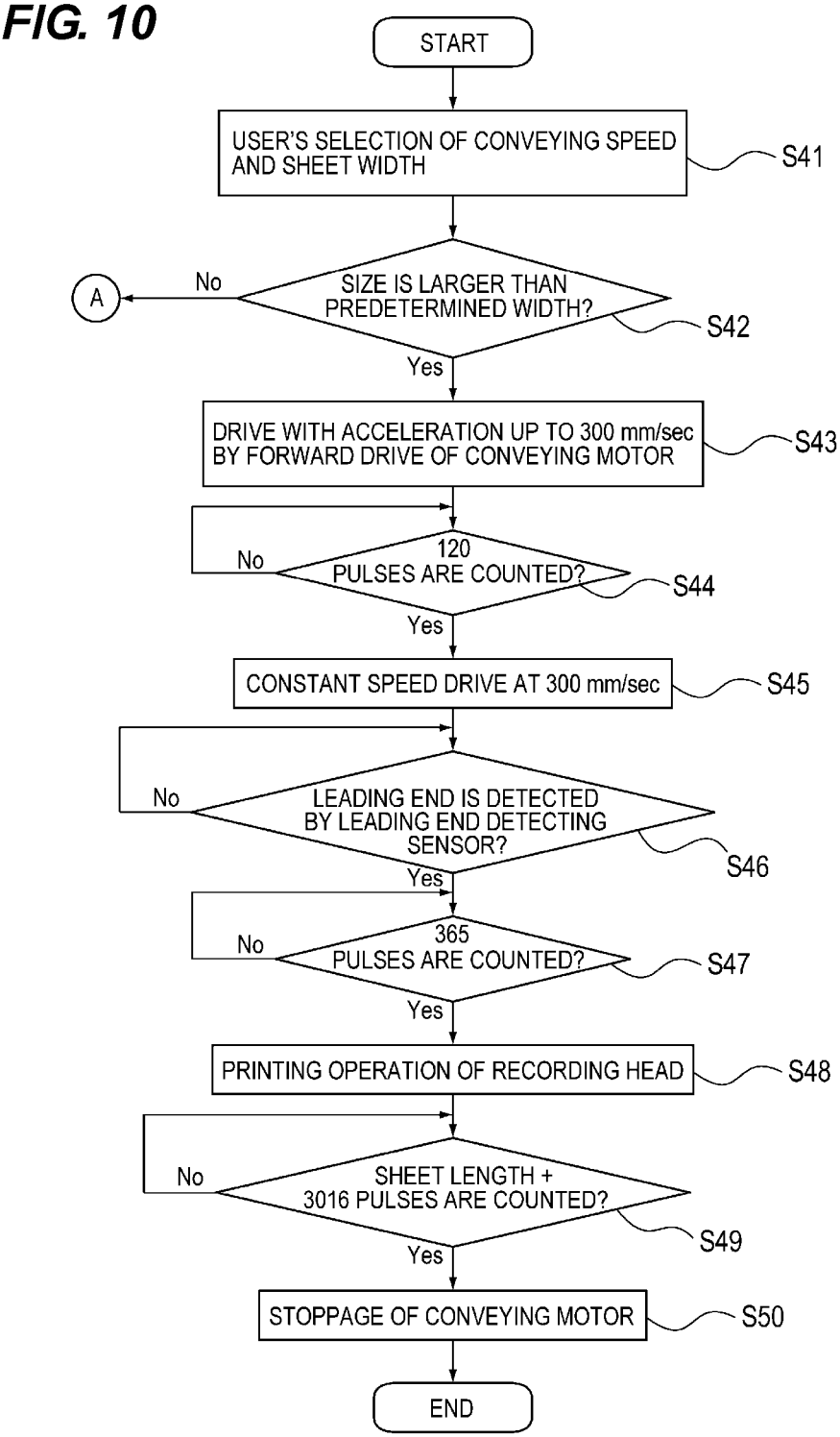
FIG. 10 is a flowchart showing an operation when the roll paper has a width that is equal to or larger than a predetermined width in the conveying apparatus according to the second embodiment of the present invention.
Figure 11:
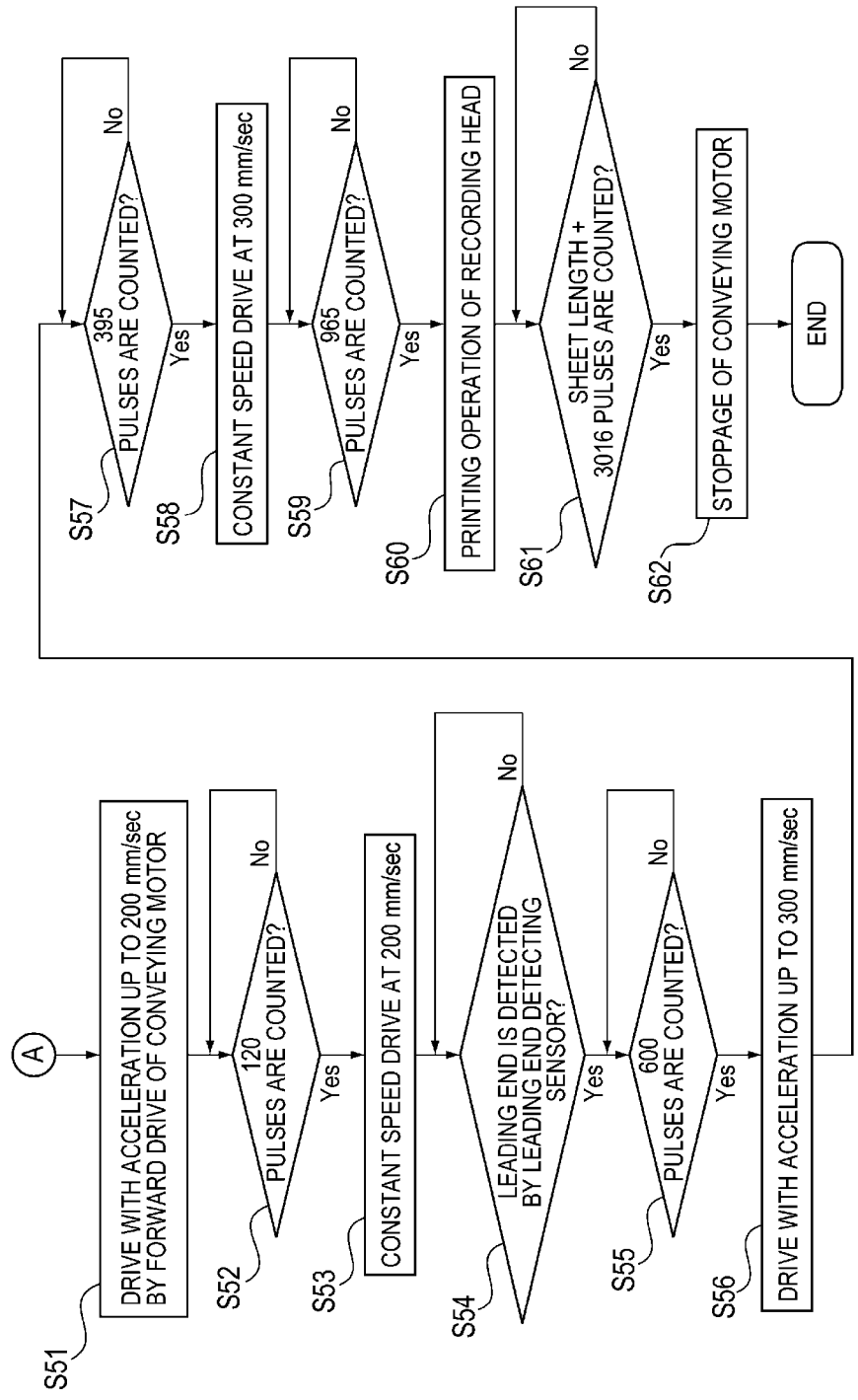
FIG. 11 is a flowchart showing an operation when the roll paper has a width that is less than a predetermined width in the conveying apparatus according to the second embodiment of the present invention.
Figure 12:
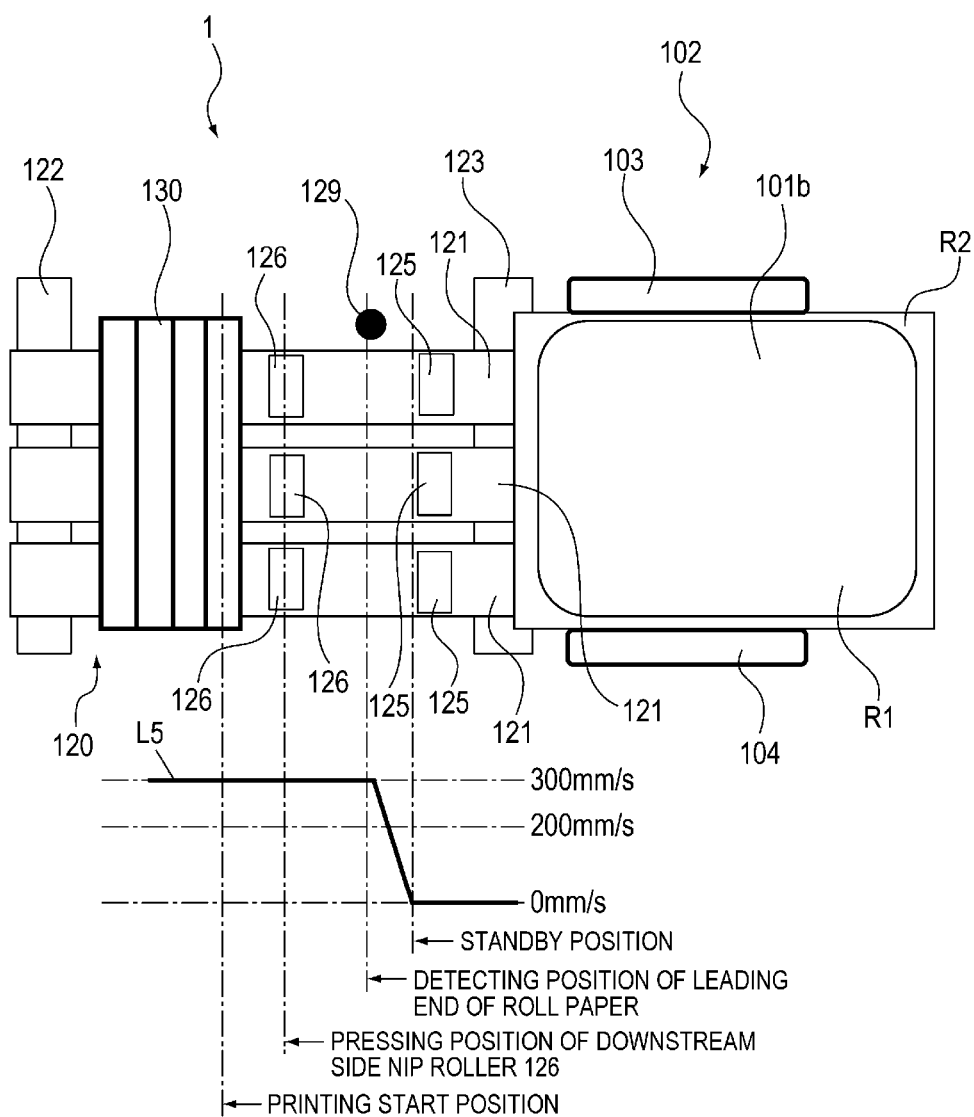
FIG. 12 is a plan view schematically showing a conveying apparatus according to the second embodiment of the present invention with a diagram showing a transition of a speed of the roll paper.

The operation of the recording apparatus 100 according to the second embodiment of the present invention will be described in detail with reference to FIGS. 10 to 12. FIG. 10 is a flowchart showing an operation when the roll paper has a width that is equal to or larger than a predetermined width in the conveying apparatus according to the second embodiment of the present invention. FIG. 11 is a flowchart showing an operation when the roll paper has a width that is less than the predetermined width in the conveying apparatus according to the second embodiment of the present invention. FIG. 12 is a plan view schematically showing a conveying apparatus according to the second embodiment of the present invention with a diagram showing a transition of a speed of the roll paper.

The present embodiment is characterized in that the conveying control of the first nipping and conveying unit and the second nipping and conveying unit is changed according to the size of the roll paper 101 in the width direction orthogonal to the conveying direction of the roll paper 101. More specifically, the recording apparatus 100 of this embodiment performs the operation described in FIG. 8 similarly as the first embodiment in the case of conveying the roll paper 101a shown in FIG. 5 having the size in the width direction of the roll paper 101 which is less than the predetermined width at a predetermined speed. However, in the recording apparatus 100 according to the second embodiment, a first mode in which a plurality of acceleration periods are provided and a second mode in which a single acceleration period for accelerating the roll paper to a predetermined speed before reaching the detecting position without providing a plurality of acceleration periods are selectable depending on the size in the width direction of the roll paper 101 and the like. This selection can be made from the personal computer 140 connected to the recording apparatus 100 or an operation portion (not shown) provided in the recording apparatus 100.

First, when a user inputs data concerning the selection of the conveying speed and the selection of the paper width on the personal computer 140 (step S41), the CPU 150a as a control unit receives from the personal computer 140 the recording data and the commands concerning the conveying speed and the paper width set by a user. The CPU 150a can determine the size of the fed roll paper in the width direction by detecting the position of the movable guide 104 based on the resistance value of a signal input from the volume sensor 180 of the guide unit 102. The movable guide 104 is moved by a user according to the width of the roll paper 101.

Next, based on the received commands or the resistance value of the signal input from the volume sensor 180 of the guide unit 102, the CPU 150a determines whether or not the width direction size of the roll paper 101 for recording is equal to or greater than the predetermined width (step S42).

Next, when the width direction size of the roll paper 101 is equal to or greater than the predetermined width (step S42: Yes), the CPU 150a drives the conveying motor 170 in the forward direction to accelerate the drive pulley 122 and the conveying belt 121 and to accelerate the roll paper 101 to the set conveying speed (step S43). The set conveying speed is exemplified as 300 mm/sec here.

For example, as shown by L5 in FIG. 12, the CPU 150a accelerates the roll paper 101 whose leading end of the rolled paper (sheet portion) 101 is stopped at the standby position to the set conveying speed of 300 mm/sec.

At this time, the roll paper 101 is nipped and conveyed by the upstream side nip rollers 125 (first nip roller, second nip roller), so that the pressing force N1 is applied to the roll paper 101 by each of the upstream side nip rollers 125. Each of the upstream side nip rollers 125 is provided in a region different from the other upstream side nip rollers 125 in the direction of the rotational axis of the upstream side nip rollers 125. Further, the conveying speed of the roll paper 101 is increased in a state in which the pressing force N1 is applied to the roll paper 101 from each of the upstream side nip rollers 125.

Next, the CPU 150a determines whether or not the predetermined number of pulses has been counted, which is required for the leading end of the roll paper 101 to be conveyed to a position before the detecting position of the leading end detecting sensor 129 (step S44). In this case, the predetermined number of pulses is exemplified as 120. Further, the conveying distance from the standby position is exemplified as 15 mm.

When the CPU 150a has not count the predetermined number of pulses (step S44: No), the CPU 150a repeats the operation of step S44.

On the other hand, when the CPU 150a has counted the predetermined number of pulses (step S44: Yes), the CPU 150a controls the conveying motor 170 to drive the conveying belt 121 at a constant speed, so that the roll paper 101 is conveyed at the set conveying speed (second predetermined speed)(step S45).

For example, as indicated by L5 in FIG. 12, the CPU 150a conveys the roll paper 101 at the constant speed of 300 mm/sec when the predetermined number of pulses is counted and the leading end of the roll paper 101 reaches a position before the detecting position of the leading end detecting sensor 129.

Next, the CPU 150a determines whether or not the leading end of the roll paper 101 is detected by the leading end detecting sensor 129 based on the input signal from the leading end detecting sensor 129 in a state in which the conveying belt 121 is driven at a constant speed (step S46).

When the CPU 150a does not detect the leading end of the roll paper 101 (step S46: No), the CPU 150a repeats the operation of step S46.

On the other hand, when detecting the leading end of the roll paper 101 (step S46: Yes), the CPU 150a determines whether or not the predetermined number of pulses has been counted, which is required for the leading end of the roll paper 101 to be conveyed to the detecting position to the printing start position (step S47). In this case, the predetermined number of pulses is exemplified as 965. Further, the conveying distance from the detecting position to the printing start position is exemplified as 48 mm.

When the CPU 150*a* has not count the predetermined number of pulses (step S47: No), the CPU 150*a* repeats the operation of step S47.

On the other hand, when the CPU 150*a* has counted the predetermined number of pulses (step S47: Yes), the CPU 150*a* starts the printing operation of the recording head 130 (step S48).

Next, the CPU 150*a* determines whether or not the number of pulses has been counted which is the summation of the predetermined number of pulses required for the leading end of the roll paper 101 to be conveyed from the detecting position to the cutting position and the number of pulses corresponding to the length of the sheet of the roll paper 101 (step S49). In this case, the predetermined number of pulses is exemplified as 3016. The conveying distance from the detecting position to the cutting position is exemplified as 142 mm.

When the number of pulses which is the summation of the number of pulses corresponding to the length of the sheet of the roll paper 101 and the predetermined number of pulses has not been counted (step S49: No), the CPU 150*a* repeats the operation of step S49.

On the other hand, when the CPU 150*a* has counted the number of pulses which is the summation of the predetermined number of pulses and the number of pulses corresponding to the length of the sheet of the roll paper 101 (step S49: Yes), the CPU 150*a* stops the printing operation of the recording head 130. Then, the CPU 150*a* stops the conveying motor 170 (step S50), and then stops the image forming operation.

The CPU 150*a* maintains the state of the constant speed drive in step S45 until the printing operation is completed. For example, as indicated by L5 in FIG. 12, the control portion 150 maintains, until the printing operation is completed, the state in which the roll paper 101 is conveyed at the constant speed of 300 mm/sec.

In this manner, the CPU 150*a* of the control portion 150 sets the acceleration period in which the back tension T becomes large before the detecting position of the leading end detecting sensor 129. After that, the CPU 150*a* makes control such that the roll paper 101 is conveyed at a set constant speed. The back tension T acting on the roll paper 101 during the constant speed conveyance is only the torque limiter tension generated by the torque limiter 111 since the angular acceleration of the roll paper 101 becomes zero, so that the inertia force of the roll paper 101 becomes zero. As a result, it is possible to suppress a deviation in the conveying distance after the leading end of the roll sheet 101 is detected by the leading end detecting sensor 129.

On the other hand, when the size of the roll paper 101 in the width direction is less than the predetermined width (when the size is a first size) (step S42: No), the CPU 150*a* drives the conveying motor 170 of the conveying unit 120 in the forward direction to accelerate the drive pulley 122 and the conveying belt 121. Then, the CPU 150*a* accelerates the roll paper 101 to the conveying speed of the first step (step S51). The conveying speed of the first step is exemplified as 200 mm/sec.

At this time, the roll paper 101 is nipped and conveyed by the upstream side nip roller 125, so that the pressing force N1 is applied to the roll paper 101 by the upstream side nip roller 125. Further, the conveying speed of the roll paper 101 is increased in a state where the pressing force N1 is applied to the roll paper 101. In the first acceleration period required for this acceleration, the leading end of the roll paper 101 reaches the first predetermined speed of 200 mm/sec before reaching the detecting position of the leading end detecting sensor 129.

Next, the CPU 150*a* determines whether or not a predetermined number of pulses has been counted, which is required for the leading end of the roll sheet 101 to be conveyed to a position before the detecting position (step S52). In this case, the predetermined number of pulses is exemplified as 120. In this case, the conveying distance from the standby position is exemplified as, for example, 15 mm.

When the CPU 150*a* has not counted the predetermined number of pulses (step S52: No), the CPU 150*a* repeats the operation of step S52.

On the other hand, when the CPU 150*a* has counted the predetermined number of pulses (step S52: Yes), the CPU 150*a* controls the conveying motor 170 to drive the conveying belt 121 at a constant speed, so that the roll paper 101 is conveyed at the first step constant conveying speed (first predetermined speed) (step S53). The CPU 150*a* of the control portion 150 performs a control such that the roll paper 101 is conveyed at a constant speed when the leading end of the roll paper 101 passes through the detecting position of the leading end detecting sensor 129. When the leading end of the roll paper is detected by the leading end detecting sensor 129, the roll paper is conveyed at a constant speed, so that the detection with high precision can be obtained. The constant speed period in which the CPU 150*a* performs the constant speed conveyance is a period in which the roll paper 101 (the sheet portion) is conveyed at the constant speed of the first predetermined speed (200 mm/sec) before the leading end of the roll paper 101 reaches the detecting position until the leading end of the roll paper 101 is nipped by the conveying belt 121 and the downstream side nip roller 126 (second rotating body).

As described above, the CPU 150*a* of the control portion 150 performs a control such that the roll paper 101 is conveyed at a constant speed when the leading end of the roll paper 101 passes through the detecting position of the leading end detecting sensor 129 before the conveying speed reaches the set conveying speed.

Next, the CPU 150*a* determines whether or not the leading end of the roll paper 101 is detected by the leading end detecting sensor 129 based on the input signal from the leading end detecting sensor 129 in a state in which the conveying belt 121 is driven at a constant speed (step S54).

When the CPU 150*a* does not detect the leading end of the roll paper 101 (step S54: No), the CPU 150*a* repeats the operation of step S54.

On the other hand, when detecting the leading end of the roll paper 101 (step S54: Yes), the CPU 150*a* determines whether or not the predetermined number of pulses has been counted, which is required for the leading end of the roll paper 101 to be conveyed to the pressing position (nipping position) (step S55). In this case, the predetermined number of pulses is exemplified as 600. Further, the conveying distance from the detecting position to the pressing position (nipping position) of the downstream side nip roller 126 is exemplified as 25 mm.

When the CPU 150*a* has not count the predetermined number of pulses (step S55: No), the CPU 150*a* repeats the operation of step S55.

On the other hand, when the CPU 150*a* has counted the predetermined number of pulses (step S55: Yes), the CPU 150*a* controls the conveying motor 170 to accelerate the conveying belt 121 to the set conveying speed, so that the roll paper 101 is accelerated again to the set conveying speed (step S56). The set conveying speed here is the second step conveying speed.

At this time, the roll paper 101 is nipped and conveyed by the upstream side nip roller 125 and the downstream side nip roller 126, so that not only the pressing force N1 is applied to the roll paper 101 by the upstream side nip roller 125 but also the pressing force N2 is applied to the roll paper 101 by the downstream side nip roller 126. Further, the conveying speed of the roll paper 101 is increased in a state where the pressing force N1 and the pressing force N2 are applied to the roll paper 101.

As described above, the CPU 150a of the control portion 150 accelerates the roll paper 101 in a stepwise fashion up to the set second predetermined speed. For example, the CPU 150a accelerates, until the conveying speed reaches 300 mm/sec, the roll paper 101 whose leading end reaches the nipping position which is the pressing position of the downstream side nip roller 126 while the roll paper 101 is nipped and conveyed by the downstream side nip roller 126 and the conveying belt 121 which constitute the second nipping and conveying unit. This acceleration period is the second acceleration period in which the roll paper 101 is accelerated after the leading end of the roll paper 101 is nipped by the second nipping and conveying unit before the recording performed by the recording unit is started.

Next, the CPU 150a determines whether or not a predetermined number of pulses has been counted, which is required for the leading end of the roll sheet 101 to be conveyed from the detecting position of the leading end detecting sensor 129 to a position before the printing start position (step S57). In this case, the predetermined number of pulses is exemplified as 395. In this case, the conveying distance from the detecting position is exemplified as, for example, 31.6 mm.

When the CPU 150a has not counted the predetermined number of pulses (step S57: No), the CPU 150a repeats the operation of step S57.

On the other hand, when the CPU 150a has counted the predetermined number of pulses (step S57: Yes), the CPU 150a controls the conveying motor 170 to drive the conveying belt 121 at a constant speed, so that the roll paper 101 is conveyed at the set conveying speed (second predetermined speed)(step S58). As a result, the roll paper 101 is conveyed to the recording head 130 at the predetermined speed.

Next, the CPU 150a determines whether or not a predetermined number of pulses has been counted, which is required for the leading end of the roll sheet 101 to be conveyed from the detecting position to the printing start position (step S59). In this case, the predetermined number of pulses is exemplified as 965. In this case, the conveying distance from the detecting position to the printing start position is exemplified as, for example, 48 mm.

When the CPU 150a has not counted the predetermined number of pulses (step S59: No), the CPU 150a repeats the operation of step S59.

On the other hand, when the CPU 150a has counted the predetermined number of pulses (step S59j: Yes), the CPU 150a starts the printing operation of the recording head 130 (step S60).

Next, the CPU 150a determines whether or not the number of pulses has been counted which is the summation of the predetermined number of pulses required for the leading end of the roll paper 101 to be conveyed from the detecting position of the leading end detecting sensor 129 to the cutting position and the number of pulses corresponding to the length of the sheet of the roll paper 101 (step S61). In this case, the predetermined number of pulses is exemplified as 3016. The conveying distance from the detecting position to the cutting position is exemplified as 142 mm. Here, the "length of the sheet" is the length of the label area R1 on the roll paper 101 in the conveying direction.

When the CPU 150a has counted the number of pulses which is the summation of the predetermined number of pulses and the number of pulses corresponding to the length of the sheet of the roll paper 101 (step S61: Yes), the CPU 150a stops the printing operation of the recording head 130. Then, the CPU 150a stops the conveying motor 170 (step S62), and then stops the printing operation.

The CPU 150a maintains the state of the constant speed drive in step S58 until the printing operation is completed.

In the first embodiment described above, when the set conveying speed is a predetermined speed, the roll paper 101 is accelerated in a stepwise fashion in two steps until reaching the set conveying speed. On the other hand, in the second embodiment of the present invention, when the set conveying speed is the predetermined speed, the acceleration control in accelerating the roll paper 101 is changed depending on the width direction size of the roll paper 101 to be conveyed.

Specifically, the roll paper 101b shown in FIG. 12 whose width direction size (second width) is equal to or larger than the predetermined width is nipped by the three upstream side nip rollers 125 and the three conveying belts 121 and the conveying force is applied by each of the three upstream nip rollers 125 and the three conveying belts 121. As a result, the roll paper 101b is given a sufficiently large conveying force F (T2<F) by the upstream side nip rollers 125 with respect to the tension T2 due to the inertia force of the roll paper 101b, as understood from the above equation (1). Therefore, the recording apparatus 100 can accelerate the roll paper 101b up to the second predetermined speed of 300 mm/sec before the leading end of the roll paper 101b is detected by the leading end detecting sensor 129.

As described above, the second mode can be selected in which a single acceleration period is set for increasing the conveying speed to the second predetermined speed before the leading end of the sheet portion reaches the detecting position with the sheet portion nipped by the conveying belt and the first rotating body.

On the other hand, the roll paper 101a shown in FIG. 5 whose width direction size (first width) is less than the predetermined width is nipped by the single upstream side nip roller 125 and the single conveying belt 121 so that a conveying force is applied to the roll paper 101a by the single upstream side nip roller 125 and the single conveyance belt 121.

As a result, a sufficiently large conveying force F is not applied to the roll paper 101a by the upstream side nip roller 125 with respect to the tension T2 due to the inertia force of the roll paper 101a. Therefore, the first mode which performs a stepwise acceleration can be selected in which the recording apparatus 100 accelerates the roll paper 101a until the conveying speed reaches 200 mm/sec when the roll paper 101a is nipped only by the upstream side nip roller 125, and the recording apparatus 100 accelerates the roll paper 101a until the conveying speed reaches 300 mm/sec when the roll paper 101a is nipped by both of the upstream side nip roller 125 and the downstream side nip roller 126.

As described above, in the present embodiment, the acceleration control in the case where the conveying speed of the roll paper 101 is increased is changed in accordance with the number of upstream nip rollers 125 and the conveying belts 121 provided along the width direction, which nip the roll paper 101. For example, when a recording sheet whose size in the width direction is less than the predetermined width is used, the recording sheet is nipped and conveyed while being in contact with the first roller and not being in contact with the second roller. Further, when a recording sheet whose width direction size is a second size which is larger than the first size is used, the recording sheet is nipped and conveyed while being in contact with both the first roller and the second roller. Therefore, when the recording sheet with the first size is used, the first mode (two-step acceleration mode) according to the second embodiment of the present invention is selected and when the recording sheet with the second size is used, the second mode (one-step acceleration mode) according to the second embodiment of the present invention is selected.

Thus, when recording on a recording sheet which is larger in size in the width direction than in small size is used, the number of steps in acceleration decreases, so that when the roll paper which is larger in size in the width direction than in small size is used, the number of recording operations per unit time on the roll paper increases, thereby improving productivity. Further, the acceleration period in which the tension due to the inertia force acting as a resistance against the conveying force is given to the roll paper 101 can be provided before the leading end of the roll paper 101 passes through the detecting position of the leading end detecting sensor 129, thereby preventing the deviation of the conveying amount due to the acceleration after the leading end of the roll paper 101 has been detected by the leading end detecting sensor 129.

In the present embodiment, when the number of the upstream side nip rollers 125 and the conveying belts 121 which are provided along the width direction and nip the roll paper 101 exceeds a predetermined number, the roll paper 101 can be accelerated until the conveying speed of the roll paper 101 reaches the set conveying speed before the leading end of the roll paper 101 passes through the detecting position of the leading end detecting sensor 129 without determination whether the set conveying speed is a high speed or a low speed for conveying the roll paper 101.

Further, in the present embodiment, when the size of the roll paper 101 in the width direction is equal to or larger than a predetermined width, the roll paper 101 can be accelerated to an arbitrary conveying speed exceeding the conveying speed at the time of conveying the roll paper 101 by the upstream side nip roller 125 and the conveying belt 121.

Further, in the present embodiment, when the conveying speed set by a user is less than a predetermined speed (for example, low speed conveying at 200 mm/sec), the roll paper 101 can be accelerated until reaching the conveying speed set only for the conveying by the conveying belt 121 and the upstream side nip roller 125 without determination of the size of the roll paper 101 in the width direction.

Further, in the present embodiment, when the conveying speed set by a user is less than a predetermined speed (for example, low speed conveying at 200 mm/sec), the roll paper 101 can be accelerated until reaching the conveying speed set only for the conveying by the conveying belt 121 and the upstream side nip roller 125 without determination of the number of the upstream side nip rollers 125 and the conveying belts 121 which are provided along the width direction and nip the roll paper 101 and which nip the roll paper 101.

The present invention is not limited to the above-described embodiments, and various modifications can be made without departing from the gist thereof.

Specifically, in first and second embodiments, two nip rollers of the first nipping and conveying unit and the second nipping and conveying unit are provided. Three or more nip rollers can be provided along the conveying direction of the roll paper 101 to apply a conveying force F to the roll paper 101. In this case, even if the pressing force of each roller is reduced, a conveying force F larger than the back tension T can be obtained, thereby minimizing the damage to the roll paper 101 due to the nipping force of the nipping and conveying units.

Further, in the first and second embodiments, the conveying belt 121 can be removed and the support roller 128 can be replaced with a drive roller that is driven to rotate by the drive motor. In this case, the nipping and conveying unit is constituted by the upstream side nip roller 125 constituting the first nipping and conveying unit and the drive roller constituting a nip, and the downstream side nip roller 126 constituting the second nipping and conveying unit and the drive roller constituting a nip. The upstream nip roller 125 and the downstream nip roller 126 are brought into contact with the drive roller and driven to rotate by the rotation of the drive roller. At this time, it is preferable that the driven roller is in contact with the surface of the sheet portion on which a recording is made and the driven roller includes a foamed layer.

In the first and second embodiments, the case where the conveying speed is increased to a predetermined speed of 300 mm/sec has been described as an example, but it is also possible to increase the conveying speed to an arbitrary predetermined speed other than 300 mm/sec.

Further, in the first and second embodiments, the stepwise acceleration is performed in two steps, but the stepwise acceleration can be performed in three or more steps.

Further, in the first and second embodiments, it is possible not to provide the support roller 128 which is for suppressing the displacement of the conveying belt 121 due to the pressing in the direction of arrow A. In such a configuration, it is preferable to adjust the pressing force of the upstream side nip roller 125 and the downstream side nip roller 126 in the direction of arrow A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-247000, filed Dec. 22, 2017, and Japanese Patent Application No. 2018-237584, filed Dec. 19, 2018, which are hereby incorporated by reference herein in their entirety.

What is claimed is:

1. A recording apparatus, comprising:
   a holding unit configured to hold a roll-shaped recording sheet;
   a first nipping and conveying unit configured to nip and convey a sheet portion drawn out from the roll-shaped recording sheet which is held by the holding unit;
   a detecting unit configured to detect the sheet portion at a detecting position which is provided downstream of a nipping position of the first nipping and conveying unit in a conveying direction of the sheet portion;
   a second nipping and conveying unit provided downstream of the detecting position in the conveying direction of the sheet portion, the second nipping and conveying unit being configured to nip and convey the sheet portion with the sheet portion being nipped by the first nipping and conveying unit;

a recording unit configured to perform recording on the sheet portion conveyed by the second nipping and conveying unit; and a control unit configured to control a conveying speed of the sheet portion conveyed by the first nipping and conveying unit and the second nipping and conveying unit, wherein the control unit sets a first acceleration period in which the conveying speed is increased up to a first predetermined speed before a leading end of the sheet portion reaches the detecting position with the sheet portion being nipped by the first nipping and conveying unit, wherein the control unit sets a constant speed period in which the conveying speed is kept constant at the first predetermined speed from a timing when the conveying speed reaches the first predetermined speed to a timing when the leading end of the sheet portion is nipped by the second nipping and conveying unit, and wherein, before the recording by the recording unit is started and after the leading end of the sheet portion is nipped by the second nipping and conveying unit, the control unit sets a second acceleration period in which the conveying speed is increased up to a second predetermined speed which is higher than the first predetermined speed.

2. The recording apparatus according to claim 1, wherein the control unit is able to select one of a first mode and a second mode, wherein in the first mode, the first acceleration period, the first constant speed period, and the second acceleration period are set, and wherein in the second mode, a single acceleration period is set in which the conveying speed is increased up to the second predetermined speed before the leading end of the sheet portion reaches the detecting position with the sheet portion being nipped by the first nipping and conveying unit.

3. The recording apparatus according to claim 2, wherein the control unit selects the first mode when the sheet portion has a first width in a direction crossing the conveying direction and selects the second mode when the sheet portion has a second width which is larger wider than the first width.

4. The recording apparatus according to claim 3, wherein the first nipping and conveying unit comprises a first roller and a second roller provided in a region different from that of the first roller in a direction of a rotational axis of the first roller, and wherein the sheet portion is in contact with the first roller without being in contact with the second roller when the sheet portion having the first width is conveyed by the first nipping and conveying unit and the sheet portion is in contact with the first roller and the second roller when the sheet portion having the second width is conveyed by the first nipping and conveying unit.

5. The recording apparatus according to claim 2, wherein the conveying speed is the second predetermined speed when the recording on the sheet portion is performed by the recording unit in the first mode and the second mode.

6. The recording apparatus according to claim 1, wherein the control unit is able to select one of a first mode and a second mode, wherein in the first mode, the first acceleration period, the first constant speed period, and the second acceleration period are set, and wherein in the second mode, the first acceleration period and the first constant speed period are set without the second acceleration period.

7. The recording apparatus according to claim 6, wherein the conveying speed is the second predetermined speed when the recording on the sheet portion is performed by the recording unit in the first mode and the conveying speed is the first predetermined speed when the recording on the sheet portion is performed by the recording unit in the second mode.

8. The recording apparatus according to claim 1, wherein the control unit sets a second constant speed period in which the conveying speed is kept constant at the second predetermined speed until the leading end of the sheet portion reaches a recording position at which the recording unit performs the recording.

9. The recording apparatus according to claim 1, wherein the control unit controls timing of the recording on the sheet portion performed by the recording unit based on a detecting result of the detecting unit.

10. The recording apparatus according to claim 1, wherein each of the first nipping and conveying unit and the second nipping and conveying unit comprises a drive roller configured to be driven to rotate and a driven roller configured to be in contact with the drive roller and to be driven to rotate by rotation of the drive roller.

11. The recording apparatus according to claim 10, wherein the driven roller is in contact with a surface of the sheet portion on which a recording is made and the driven roller includes a foamed layer.

12. The recording apparatus according to claim 1, wherein the leading end of the sheet portion is located downstream of a nipping position of the first nipping and conveying unit and upstream of the detecting position with respect to the conveying direction of the sheet portion when the first nipping and conveying unit starts to convey the sheet portion.

13. The recording apparatus according to claim 1, wherein the holding unit comprises a load applying member configured to apply load in a direction opposite to the conveying direction of the sheet portion when the sheet portion is conveyed from the roll-shaped recording sheet.

14. A recording apparatus, comprising:

a holding unit configured to hold a roll-shaped recording sheet;

a conveying belt configured to convey a sheet portion drawn out from the roll-shaped recording sheet which is held by the holding unit;

a recording unit configured to perform recording on the sheet portion conveyed by the conveying belt;

a first rotating body configured to be in contact with the conveying belt and to nip and convey the sheet portion with the conveying belt;

a detecting unit configured to detect the sheet portion at a detecting position which is provided downstream of a nipping position between the first rotating body and the conveying belt in a conveying direction of the sheet portion;

a second rotating body provided downstream of the detecting position in the conveying direction of the sheet portion, the second rotating body being configured to be in contact with the conveying belt and to nip and convey the sheet portion with the conveying belt with the sheet portion being nipped by the conveying belt and the first rotating body; and a control unit configured to control a conveying speed of the sheet portion conveyed by the conveying belt, wherein the control unit sets a first acceleration period in which the conveying speed is increased up to a first predetermined speed before a leading end of the sheet portion reaches the detecting position with the sheet portion being nipped by the conveying belt and the first rotating body, wherein the control unit sets a constant speed period in which the conveying speed is kept constant at the first predetermined speed from a timing when the conveying speed reaches the first predetermined speed to a timing when the leading end of the sheet portion is nipped by the conveying belt and the second rotating body, and wherein, before the recording by the recording unit is started and after the leading end of the sheet portion is nipped by the conveying belt and the second rotating body, the control unit sets a second acceleration period in which the conveying speed is increased up to a second predetermined speed.

15. (The recording apparatus according to claim 14,
wherein the control unit is able to select one of a first mode and a second mode,
wherein in the first mode, the first acceleration period, the first constant speed period, and the second acceleration period are set, and
wherein in the second mode, a single acceleration is set in which the conveying speed is increased up to the second predetermined speed before the leading end of the sheet portion reaches the detecting position with the sheet portion being nipped by the conveying belt and the first rotating body.

16. The recording apparatus according to claim 15,
wherein the control unit selects the first mode when the sheet portion has a first width in a direction crossing the conveying direction and selects the second mode when the sheet portion has a second width which is wider than the first width.

17. The recording apparatus according to claim 16,
wherein the first rotating body comprises a first roller and a second roller provided in a region different from that of the first roller in a direction of a rotational axis of the first roller, and
wherein the sheet portion is in contact with the first roller without being in contact with the second roller when the sheet portion having the first width is conveyed by the first rotating body and the sheet portion is in contact with the first roller and the second roller when the sheet portion having the second width is conveyed by the first rotating body.

18. The recording apparatus according to claim 15,
wherein the conveying speed is the second predetermined speed when the recording on the sheet portion is performed by the recording unit in the first mode and the second mode.

19. The recording apparatus according to claim 14,
wherein the control unit is able to select one of a first mode and a second mode,
wherein in the first mode, the first acceleration period, the first constant speed period, and the second acceleration period are set, and
wherein in the second mode, the first acceleration period and the first constant speed period are set without the second acceleration period.

20. The recording apparatus according to claim 19,
wherein the conveying speed is the second predetermined speed when the recording on the sheet portion is performed by the recording unit in the first mode and the conveying speed is the first predetermined speed when the recording on the sheet portion is performed by the recording unit in the second mode.

21. The recording apparatus according to claim 14,
wherein the control unit sets a second constant speed period in which the conveying speed is kept constant at the second predetermined speed until the leading end of the sheet portion reaches a recording position at which the recording unit performs the recording.

22. The recording apparatus according to claim 14,
wherein the control unit controls timing of the recording on the sheet portion performed by the recording unit based on a detecting result of the detecting unit.

23. The recording apparatus according to claim 14,
wherein the first rotating body and the second rotating body are configured to be driven to rotate by rotation of the conveying belt.

24. The recording apparatus according to claim 14,
wherein the leading end of the sheet portion is located downstream of the nipping position between the first rotating body and the conveying belt and upstream of the detecting position with respect to the conveying direction of the sheet portion when the conveying belt starts to move.

25. The recording apparatus according to claim 14,
wherein the holding unit comprises a load applying member configured to apply load in a direction opposite to the conveying direction of the sheet portion when the sheet portion is conveyed from the roll-shaped recording sheet.

26. The recording apparatus according to claim 14,
wherein each of the first rotating body and the second rotating body includes a foamed layer.

* * * * *